(12) United States Patent
Sugita et al.

(10) Patent No.: US 9,064,460 B2
(45) Date of Patent: Jun. 23, 2015

(54) DISPLAY DEVICE WITH TOUCH SENSOR INCLUDING PHOTOSENSOR

(75) Inventors: Yasuhiro Sugita, Osaka (JP); Kohei Tanaka, Osaka (JP); Naru Usukura, Osaka (JP); Tadashi Nemoto, Osaka (JP); Hiromi Katoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 13/698,745

(22) PCT Filed: May 19, 2011

(86) PCT No.: PCT/JP2011/061497
§ 371 (c)(1),
(2), (4) Date: Nov. 19, 2012

(87) PCT Pub. No.: WO2011/145676
PCT Pub. Date: Nov. 24, 2011

(65) Prior Publication Data
US 2013/0063403 A1 Mar. 14, 2013

(30) Foreign Application Priority Data
May 20, 2010 (JP) ................................. 2010-116413

(51) Int. Cl.
| | | |
|---|---|---|
| G06F 3/042 | (2006.01) | |
| G09G 3/34 | (2006.01) | |
| G02F 1/1333 | (2006.01) | |
| G02F 1/135 | (2006.01) | |
| G02F 1/133 | (2006.01) | |

(52) U.S. Cl.
CPC ........ *G09G 3/3406* (2013.01); *G09G 2360/145* (2013.01); *G02F 1/13338* (2013.01); *G02F 2001/13312* (2013.01); *G02F 1/1354* (2013.01); *G06F 3/042* (2013.01)

(58) Field of Classification Search
CPC .................... G09G 2360/14; G09G 2360/142; G09G 2360/144; G09G 2360/145; G06F 3/0421
USPC .................................. 345/207, 156, 173–178
See application file for complete search history.

(56) References Cited

U.S. PATENT DOCUMENTS

| | | | |
|---|---|---|---|
| 2006/0103637 A1 | 5/2006 | Yamaguchi et al. | |
| 2010/0134452 A1 | 6/2010 | Katoh et al. | |
| 2010/0193804 A1 | 8/2010 | Brown et al. | |

FOREIGN PATENT DOCUMENTS

| | | |
|---|---|---|
| JP | 3521187 B2 | 4/2004 |
| JP | 2008-096928 A | 4/2008 |
| JP | 4072732 B2 | 4/2008 |
| JP | 2008-202828 A | 9/2008 |
| WO | 2007/145346 A1 | 12/2007 |
| WO | 2007/145347 A1 | 12/2007 |
| WO | 2008/126873 A1 | 10/2008 |
| WO | 2008/156023 A1 | 12/2008 |

OTHER PUBLICATIONS

Official Communication issued in International Patent Application No. PCT/JP2011/061497, mailed on Jul. 26, 2011.

*Primary Examiner* — Ram Mistry
(74) *Attorney, Agent, or Firm* — Keating & Bennett, LLP

(57) ABSTRACT

Provided is a display device that has a photodetection element in a pixel, and has an input function that is not dependent on the light environment. The display device includes a photosensor in a pixel region. The photosensor includes a first sensor pixel circuit that outputs a sensor signal that corresponds to charge accumulated in an accumulation period when a light source for the sensor is lit, and a second sensor pixel circuit that outputs a sensor signal that corresponds to charge accumulated in an accumulation period when the light source is extinguished. The photosensor has, as operation modes in one frame period, a sensor drive mode for obtaining sensor signals from the first and second sensor pixel circuits, a first correction data acquisition mode for acquiring first correction data for correcting the sensor signal from the first sensor pixel circuit, and a second correction data acquisition mode for acquiring second correction data for correcting the sensor signal from the second sensor pixel circuit.

14 Claims, 23 Drawing Sheets

DISPLAY DEVICE WITH TOUCH SENSOR INCLUDING PHOTOSENSOR

TECHNICAL FIELD

The present invention relates to a display device that has a photodetection element such as a photodiode in a pixel, and in particular relates to a display device in which a photosensor signal can be automatically corrected (calibrated) during operation of the display device.

BACKGROUND ART

Conventionally, there is known to be a method of providing a display device with multiple photosensors in the display panel and providing an input function using a touch panel, pen input, a scanner, or the like. The influence of the light environment needs to be eliminated in order to apply this method to mobile devices that are used in various light environments. In view of this, there is also known to be a method of removing a component that is dependent on the light environment from a signal detected by a photosensor in order to obtain the signal that was originally intended to be input.

Japanese Patent No. 4072732 discloses an input/output device that has photoreception elements provided in correspondence with individual display elements, in which the backlight is lit and extinguished one time in one frame period, and resetting and readout are performed on the photoreception elements in a line-sequential manner so as to acquire the light amount in the backlight lit period and the light amount in the backlight extinguished period in one frame period from all of the photoreception elements.

FIG. 25 is a diagram showing backlight lighting and extinguishing timings and photoreception element resetting and readout timings that are disclosed in Japanese Patent No. 4072732. As shown in FIG. 25, the backlight is lit in the first half of a frame period and extinguished in the last half. In the backlight lit period, resetting is performed on the photoreception elements in a line-sequential manner (solid arrow), and then readout from the photoreception elements is performed in a line-sequential manner (dashed arrow). In the backlight extinguished period as well, resetting and readout are performed on the photoreception elements in a similar manner.

Japanese Patent No. 3521187 discloses a solid-state imaging device that includes the unit photoreception portion shown in FIG. 26. The unit photoreception portion shown in FIG. 26 includes one photoelectric conversion portion PD and two charge accumulation portions C1 and C2. When both external light and light from a light-emitting means that has been reflected by an object are received, a first sample gate SG1 switches on, and charge generated by the photoelectric conversion portion PD is accumulated in the first charge accumulation portion C1. When only external light is received, a second sample gate SG2 switches on, and charge generated by the photoelectric conversion portion PD is accumulated in the second charge accumulation portion C2. The amount of light from the light-emitting means that was reflected by the object can then be obtained by obtaining the difference between the amounts of charge accumulated in the two charge accumulation portions C1 and C2.

With a display device that has multiple photosensors provided in a display panel, readout from the photosensors is generally performed in a line-sequential manner. Also, backlights for mobile devices are lit at the same time and extinguished at the time over the whole screen.

With the input/output device disclosed in Japanese Patent No. 4072732, the backlight is lit and extinguished one time in one frame period, resetting and readout are performed in non-overlapping periods in the backlight lit period, and resetting and readout are performed in non-overlapping periods in the backlight extinguished period as well. For this reason, readout from the photoreception elements needs to be performed in ¼ of the frame period (e.g., in 1/240 sec if the frame rate is 60 frames/sec). However, performing readout at such a high speed is actually quite difficult.

Also, there is a deviation of ½ of a frame period between the period in which the photoreception elements detect light in the backlight lit period (B1 shown in FIG. 25), and the period in which the photoreception elements detect light in the backlight extinguished period (B2 shown in FIG. 25). The ability to follow motion input therefore fluctuates according to the input direction. Also, with this input/output device, readout starts immediately after the completion of resetting, and resetting starts immediately after the completion of readout. The durations of and intervals between the backlight lit period and the backlight extinguished period therefore cannot be determined freely.

Also, with this input/output device, the amount of light in the backlight lit period and the amount of light in the backlight extinguished period are detected by the same photoreception element. For this reason, when the amount of light in the backlight lit period is detected in a certain photoreception element, the detection of the amount of light in the backlight extinguished period cannot be started in that photoreception element until the previously detected amount of light is read out from the photoreception element.

DISCLOSURE OF INVENTION

Therefore, an object of the present invention is to resolve the above-described problems and provide a display device that has an input function that is not dependent on the light environment.

In order to achieve the above-described object, a display device disclosed here is a display device provided with an active matrix substrate, the display device including: a photosensor provided in a pixel region of the active matrix substrate; sensor drive wiring connected to the photosensor; a sensor driver circuit that supplies a sensor drive signal to the photosensor via the sensor drive wiring; an amplifier circuit that amplifies a signal that was read out from the photosensor in accordance with the sensor drive signal, and outputs the signal as a photosensor signal; a signal processing circuit that processes the photosensor signal that was output from the amplifier circuit; and a light source for the photosensor, wherein the photosensor includes a first sensor pixel circuit that, in accordance with the sensor drive signal, accumulates a charge that corresponds to an amount of light received in an accumulation period when the light source is lit, and outputs a sensor signal that corresponds to the accumulated charge when a readout period arrives, and a second sensor pixel circuit that, in accordance with the sensor drive signal, accumulates a charge that corresponds to an amount of light received in an accumulation period when the light source is extinguished, and outputs a sensor signal that corresponds to the accumulated charge when a readout period arrives, the sensor driver circuit includes as operation modes in one frame period, a sensor drive mode for obtaining the sensor signals from the first sensor pixel circuit and the second sensor pixel circuit of the photosensor, a first correction data acquisition mode in which first correction data for correcting the sensor signal obtained from the first sensor pixel circuit is acquired using a sensor drive signal that is different from that in the sensor drive mode, and a second correction data acquisition mode in which second correction data for correcting the sensor signal obtained from the second sensor pixel circuit is acquired using a sensor drive signal that is different from that in the sensor drive mode, the accumulation period when the light source is lit in the first correction data acquisition mode is shorter than the accumulation period when the light source is lit in the sensor drive mode, and the accumulation period when the light source is extinguished in the second correction data acquisition mode is shorter than the accumulation period when the light source is extinguished in the sensor drive mode.

The present invention enables providing a display device that has photodetection elements in pixels, and in particular, has an input function that is not dependent on the light environment.

DESCRIPTION OF THE INVENTION

Figure 1:
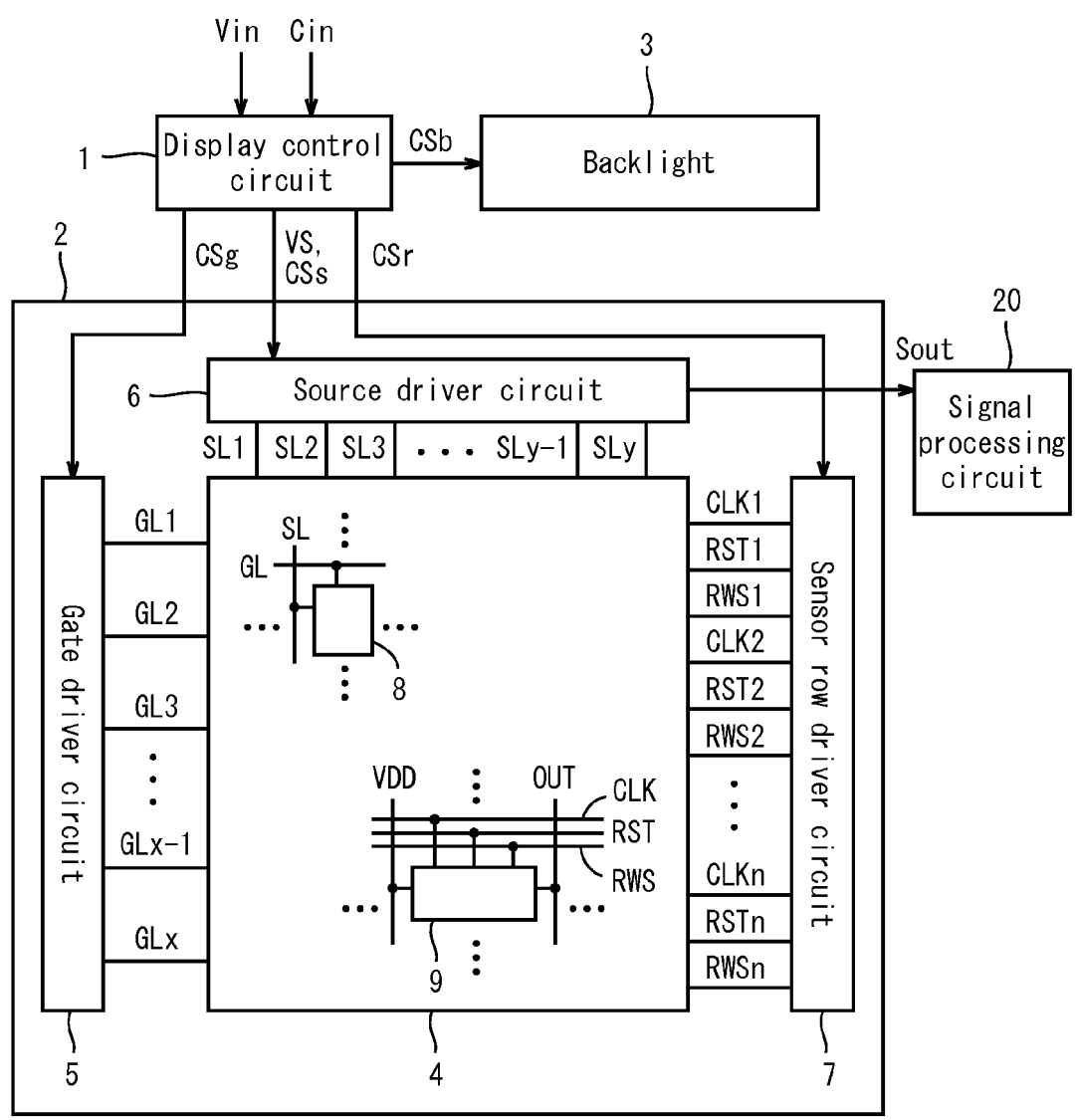
FIG. 1 is a block diagram showing a configuration of a display device according to embodiments of the present invention.

A display device according to an embodiment (first configuration) of the present invention is a display device provided with an active matrix substrate, the display device including: a photosensor provided in a pixel region of the active matrix substrate; sensor drive wiring connected to the photosensor; a sensor driver circuit that supplies a sensor drive signal to the photosensor via the sensor drive wiring; an amplifier circuit that amplifies a signal that was read out from the photosensor in accordance with the sensor drive signal, and outputs the signal as a photosensor signal; a signal processing circuit that processes the photosensor signal that was output from the amplifier circuit; and a light source for the photosensor. In this first configuration, the photosensor includes a first sensor pixel circuit that, in accordance with the sensor drive signal, accumulates a charge that corresponds to an amount of light received in an accumulation period when the light source is lit, and outputs a sensor signal that corresponds to the accumulated charge when a readout period arrives, and a second sensor pixel circuit that, in accordance with the sensor drive signal, accumulates a charge that corresponds to an amount of light received in an accumulation period when the light source is extinguished, and outputs a sensor signal that corresponds to the accumulated charge when a readout period arrives. In this first configuration, the sensor driver circuit includes as operation modes in one frame period, a sensor drive mode for obtaining the sensor signals from the first sensor pixel circuit and the second sensor pixel circuit of the photosensor, a first correction data acquisition mode in which first correction data for correcting the sensor signal obtained from the first sensor pixel circuit is acquired using a sensor drive signal that is different from that in the sensor drive mode, and a second correction data acquisition mode in which second correction data for correcting the sensor signal obtained from the second sensor pixel circuit is acquired using a sensor drive signal that is different from that in the sensor drive mode. In this first configuration, the accumulation period when the light source is lit in the first correction data acquisition mode is shorter than the accumulation period when the light source is lit in the sensor drive mode. Also, the accumulation period when the light source is extinguished in the second correction data acquisition mode is shorter than the accumulation period when the light source is extinguished in the sensor drive mode.

In the first configuration, it is preferable that a lit period of the light source in the first correction data acquisition mode is shorter than a lit period of the light source in the sensor drive mode (second configuration). In this second configuration, it is furthermore preferable that a timing at which lighting of the light source starts in one frame period in the first correction data acquisition mode is the same as that in the sensor drive mode (third configuration).

In the third configuration, it is furthermore preferable that a period from a time at which the accumulation period starts until a time at which the light source lit period ends in the first correction data acquisition mode is shorter than a period from a time at which the accumulation period starts until a time at which the light source lit period ends in the sensor drive mode (fourth configuration).

In the fourth configuration, it is furthermore preferable that the duration of a period from a time at which the accumulation period ends until a time at which the light source lit period ends in the first correction data acquisition mode is the same as the duration of a period from a time at which the accumulation period ends until a time at which the light source lit period ends in the sensor drive mode (fifth configuration).

Also, in the first configuration, it is preferable that the light source lit period in the second correction data acquisition mode is longer than the light source lit period in the first correction data acquisition mode (sixth configuration).

In the sixth configuration, it is furthermore preferable that timings at which the light source lit period starts and ends in one frame period in the second correction data acquisition mode are the same as timings at which the light source lit period starts and ends in one frame period in the sensor drive mode (seventh configuration).

In the first to seventh configurations, it is preferable that letting B be a photosensor signal level obtained from the second sensor pixel circuit in the sensor drive mode, $B_{1st}$ be a photosensor signal level obtained from the first sensor pixel circuit in the first correction data acquisition mode, and $B_{2nd}$ be a photosensor signal level obtained from the first sensor pixel circuit in the second correction data acquisition mode, the signal processing circuit obtains a corrected photosensor signal level R' from a photosensor signal level R obtained from the first sensor pixel circuit in the sensor drive mode as follows (eighth configuration).

$$R'=(R-B_{1st})-(B-B_{2nd})$$

Alternatively, in the first to seventh configurations, a configuration is possible in which in the first correction data acquisition mode, a gain correction photosensor signal level $W_{1st}$ is acquired due to the sensor driver circuit supplying a readout signal whose amplitude is smaller than the amplitude of a readout signal in the sensor drive mode, in the second correction data acquisition mode, a gain correction photosensor signal level $W_{2nd}$ is acquired due to the sensor driver circuit supplying a readout signal whose amplitude is smaller than the amplitude of the readout signal in the sensor drive mode, and letting L be the number of photosensor signal levels, the signal processing circuit obtains a corrected photosensor signal level R' from a photosensor signal level R obtained from the first sensor pixel circuit in the sensor drive mode as follows (ninth configuration).

$$R'=L\times\{R/(W_{1st}-B_{1st})-B/(W_{2nd}-B_{2nd})\}$$

Alternatively, in the first to seventh configurations, a configuration is preferable in which letting B be a photosensor signal level obtained from the second sensor pixel circuit in the sensor drive mode, $B_{1st}$ be a photosensor signal level obtained from the first sensor pixel circuit in the first correction data acquisition mode, and $B_{2nd}$ be a photosensor signal level obtained from the first sensor pixel circuit in the second correction data acquisition mode, in the first correction data acquisition mode, a gain correction photosensor signal level $W_{1st}$ is acquired due to the sensor driver circuit supplying a readout signal whose amplitude is smaller than the amplitude of a readout signal in the sensor drive mode, in the second correction data acquisition mode, a gain correction photosensor signal level $W_{2nd}$ is acquired due to the sensor driver circuit supplying a readout signal whose amplitude is smaller than the amplitude of the readout signal in the sensor drive mode, and letting L be the number of photosensor signal levels, the signal processing circuit obtains a corrected photosensor signal level R' from a photosensor signal level R obtained from the first sensor pixel circuit in the sensor drive mode as follows (tenth configuration).

$$R'=L\times\{(R-B_{1st})/(W_{1st}-B_{1st})-(B-B_{2nd})/(W_{2nd}-B_{2nd})\}$$

Also, in the first to tenth configurations, a configuration is preferable in which the first and second sensor pixel circuits include one photoreception element, one accumulation node that accumulates a charge that corresponds to the detected amount of light, a readout transistor that has a control terminal capable of electrical connection to the accumulation node, and a switching element for holding that is provided on a path of current that flows in the photoreception element, and switches on/off in accordance with the control signal (eleventh configuration).

Also, in the eleventh configuration, a configuration is furthermore preferable in which in the first and second sensor pixel circuits, the switching element for holding is provided between the accumulation node and one end of the photoreception element, and the other end of the photoreception element is connected to a reset line (twelfth configuration).

Also, in the first to tenth configurations, a configuration is preferable in which the first and second sensor pixel circuits share one photoreception element, and one end of the photoreception element is connected to one end of the switching element for holding included in each of the first and second sensor pixel circuits, and the other end of the photoreception element is connected to the reset line (thirteenth configuration).

Also, in the first to thirteenth configurations, a configuration is preferable in which the display device further includes: a common substrate opposing the active matrix substrate; and liquid crystal sandwiched between the active matrix substrate and the common substrate (fourteenth configuration).

Embodiments

Below is a description of more detailed embodiments of the present invention with reference to the drawings. Note that although the following embodiments show examples of configurations in which a display device according to the present invention is implemented as a liquid crystal display device, the display device according to the present invention is not limited to a liquid crystal display device, and is applicable to any display device that uses an active matrix substrate. It should also be noted that due to having an image pick-up function, the display device according to the present invention is envisioned to be used as, for example, a display device with a touch panel that performs input operations by detecting an object that has come close to the screen, or a bidirectional communication display device that is equipped with a display function and an image capture function.

Also, for the sake of convenience in the description, the drawings that are referenced below show simplifications of, among the constituent members of the embodiments of the present invention, only relevant members that are necessary for describing the present invention. Accordingly, the display device according to the present invention may include arbitrary constituent members that are not shown in the drawings referenced in this specification. Also, regarding the dimensions of the members in the drawings, the dimensions of the actual constituent members, the ratios of the dimensions of the members, and the like are not shown faithfully.

First Embodiment

FIG. 1 is a block diagram showing a configuration of a display device according to a first embodiment of the present invention. The display device shown in FIG. 1 includes a display control circuit 1, a display panel 2, and a backlight 3. The display panel 2 includes a pixel region 4, a gate driver circuit 5, a source driver circuit 6, and a sensor row driver circuit 7 (sensor driver circuit). The pixel region 4 includes multiple display pixel circuits 8 and multiple sensor pixel circuits 9. This display device has a function for displaying an image on the display panel 2, and a function for detecting light that enters the display panel 2. In the following, x is an integer greater than or equal to 2, y is a multiple of 3, m and n are even numbers, and the frame rate of the display device is 60 frames/sec.

The display device shown in FIG. 1 is supplied with a video signal Vin and a timing control signal Cin from the outside. Based on these signals, the display control circuit 1 outputs a video signal VS and control signals CSg, CSs, and CSr to the display panel 2, and outputs a control signal CSb to the backlight 3. The video signal VS may be the same as the video signal Vin, or may be a signal obtained by carrying out signal processing on the video signal Vin.

The backlight 3 is a light source for sensing that is provided separately from the light source for display, and irradiates light on the display panel 2. More specifically, the backlight 3 is provided on the back face side of the display panel 2 and irradiates light on the back face of the display panel 2. The backlight 3 is lit when the control signal CSb is at the high level, and is extinguished when the control signal CSb is at the low level. An infrared light source, for example, can be used as the backlight 3.

In the pixel region 4 of the display panel 2, (x×y) display pixel circuits 8 and (n×m/2) sensor pixel circuits 9 are arranged two-dimensionally. More specifically, x gate lines GL1 to GLx and y source lines SL1 to SLy are provided in the pixel region 4. The gate lines GL1 to GLx are arranged parallel to each other, and the source lines SL1 to SLy are arranged parallel to each other so as to orthogonally intersect with the gate lines GL1 to GLx. The (x×y) display pixel circuits 8 are arranged in the vicinity of the intersections between the gate lines GL1 to GLx and the source lines SL1 to SLy. Each display pixel circuit 8 is connected to one gate line GL and one source line SL. The display pixel circuits 8 are divided into those for red display, those for green display, and those for blue display. These three types of display pixel circuits 8 are arranged so as to be aligned in the direction in which the gate lines GL1 to GLx extend, and together configure one color pixel.

In the pixel region 4, n clock lines CLK1 to CLKn, n reset lines RST1 to RSTn, and n readout lines RWS1 to RWSn are provided parallel with the gate lines GL1 to GLx. There are also cases where other signal lines and power supply lines (not shown) are provided parallel with the gate lines GL1 to GLx in the pixel region 4. When performing readout from the sensor pixel circuit 9, m source lines that have been selected from among the source lines SL1 to SLy are used as power supply lines VDD1 to VDDm, and m other source lines are used as output lines OUT1 to OUTm.

Figure 2:
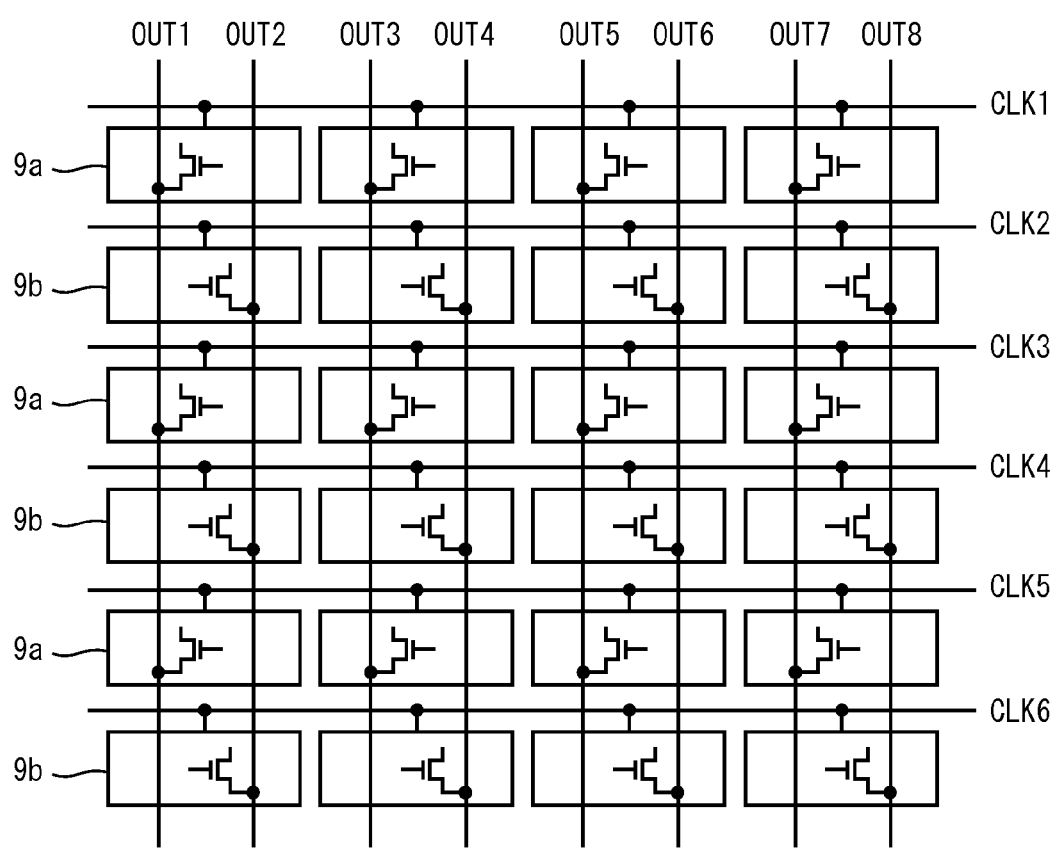
FIG. 2 is a diagram showing an arrangement of a sensor pixel circuit in a display panel included in the display device shown in FIG. 1.

FIG. 2 is a diagram showing the arrangement of the sensor pixel circuits 9 in the pixel region 4. Included among the (n×m/2) sensor pixel circuits 9 are first sensor pixel circuits 9a that detect light that entered in the lit period of the backlight 3, and second sensor pixel circuits 9b that detect light that entered in the extinguished period of the backlight 3. The number of the first sensor pixel circuits 9a is the same as the number of the second sensor pixel circuits 9b. In FIG. 2, the (n×m/4) first sensor pixel circuits 9a are arranged in the vicinity of intersections between odd-numbered clock lines CLK1 to CLKn−1 and odd-numbered output lines OUT1 to OUTm−1. The (n×m/4) second sensor pixel circuits 9b are arranged in the vicinity of intersections between even-numbered clock lines CLK2 to CLKn and even-numbered output lines OUT2 to OUTm. In this way, the display panel 2 includes multiples output lines OUT1 to OUTm for transmitting output signals of the first sensor pixel circuits 9a and output signals of the second sensor pixel circuits 9b, and the first sensor pixel circuits 9a and the second sensor pixel circuits 9b are connected to different output lines according to their type.

The gate driver circuit 5 drives the gate lines GL1 to GLx. More specifically, the gate driver circuit 5 successively selects one gate line from among the gate lines GL1 to GLx based on the control signal CSg, applies a high level potential to the selected gate line, and applies a low level potential to the remaining gate lines. Accordingly, the y display pixel circuits 8 that are connected to the selected gate line are selected all at once.

The source driver circuit 6 drives the source lines SL1 to SLy. More specifically, the source driver circuit 6 applies potentials that correspond to the video signal VS to the source lines SL1 to SLy based on the control signal CSs. Here, the source driver circuit 6 may performing driving in a line-sequential manner, or may perform driving in a point-sequential manner. The potentials that were applied to the source lines SL1 to SLy are written to the y display pixel circuits 8 that were selected by the gate driver circuit 5. In this way, a desired image can be displayed on the display panel 2 by writing potentials that correspond to the video signal VS to all of the display pixel circuits 8 using the gate driver circuit 5 and the source driver circuit 6.

The sensor row driver circuit 7 drives the clock lines CLK1 to CLKn, the reset lines RST1 to RSTn, the readout lines RWS1 to RWSn, and the like. More specifically, the sensor row driver circuit 7 applies a high level potential and a low level potential to the clock lines CLK1 to CLKn at the timings shown in FIG. 4 (described in detail later) based on the control signal CSr. The sensor row driver circuit 7 also selects (n/2) or two reset lines from among the reset lines RST1 to RSTn based on the control signal CSr, applies a reset high level potential to the selected reset lines, and applies a low level potential to the remaining reset lines. Accordingly, the (n×m/4) or m sensor pixel circuits 9 that are connected to the reset lines to which the high level potential was applied are reset all at once.

The sensor row driver circuit 7 also successively selects two adjacent readout lines from among the readout lines RWS1 to RSWn based on the control signal CSr, applies a readout high level potential to the selected readout lines, and applies a low level potential to the remaining readout lines. Accordingly, the m sensor pixel circuits 9 that are connected to the two readout lines that were selected enter a readable state all at once. At this time, the source driver circuit 6 applies a high level potential to the power supply lines VDD1 to VDDm. Accordingly, signals (referred to hereinafter as sensor signals) that correspond to the amount of light that was detected by the sensor pixel circuits 9 are output from the m sensor pixel circuits 9 that are in the readable state to the output lines OUT1 to OUTm.

The source driver circuit 6 includes a difference circuit (not shown) that obtains the difference between output signals from the first sensor pixel circuits 9a and output signals from the second sensor pixel circuits 9b. The source driver circuit 6 includes an amplifier circuit (not shown) that amplifies the light amount difference that was obtained by the difference circuit. The source driver circuit 6 outputs the amplified signal to an outside of the display panel 2 as sensor output Sout. The sensor output Sout is subjected to appropriate processing as necessary by a signal processing circuit 20 that is provided outside the display panel 2. In this way, light that entered the display panel 2 can be detected by reading out sensor signals from all of the sensor pixel circuits 9 using the source driver circuit 6 and the sensor row driver circuit 7.

Figure 3:
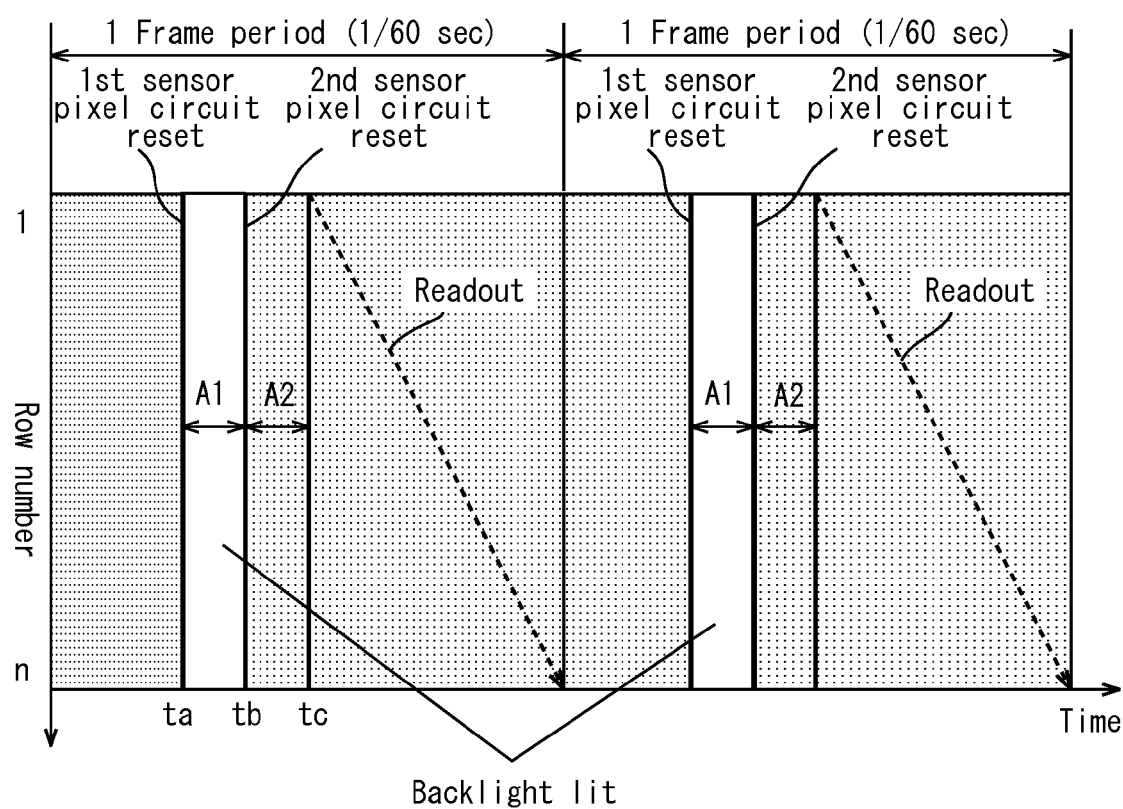
FIG. 3 is a diagram showing backlight lighting and extinguishing timings and sensor pixel circuit resetting and readout timings in the display device shown in FIG. 1.

FIG. 3 is a diagram showing backlight 3 lighting and extinguishing timings and sensor pixel circuit 9 resetting and readout timings. The backlight 3 is lit one time for a predetermined time period in one frame period, and is extinguished for the remainder of the time in that frame period. Specifically, the backlight 3 is lit at a time ta in one frame period, and is extinguished at a time tb. Also, all of the first sensor pixel circuits 9a are reset at the time ta, and all of the second sensor pixel circuits 9b are reset at the time tb.

The first sensor pixel circuits 9a detect light that entered in a period A1 (the lit period of the backlight 3) that is from the time ta to the time tb. The second sensor pixel circuits 9b detect light that entered in a period A2 (the extinguished period of the backlight 3) that is from the time tb to a time tc. The period A1 and the period A2 have the same duration. Readout from the first sensor pixel circuits 9a and readout from the second sensor pixel circuits 9b are performed in parallel in a line-sequential manner from time tc onward. Note that although readout from the sensor pixel circuits 9 is completed in one frame period in FIG. 3, this readout needs only be completed by the time the first sensor pixel circuits 9a are reset in the next frame period.

Figure 4:
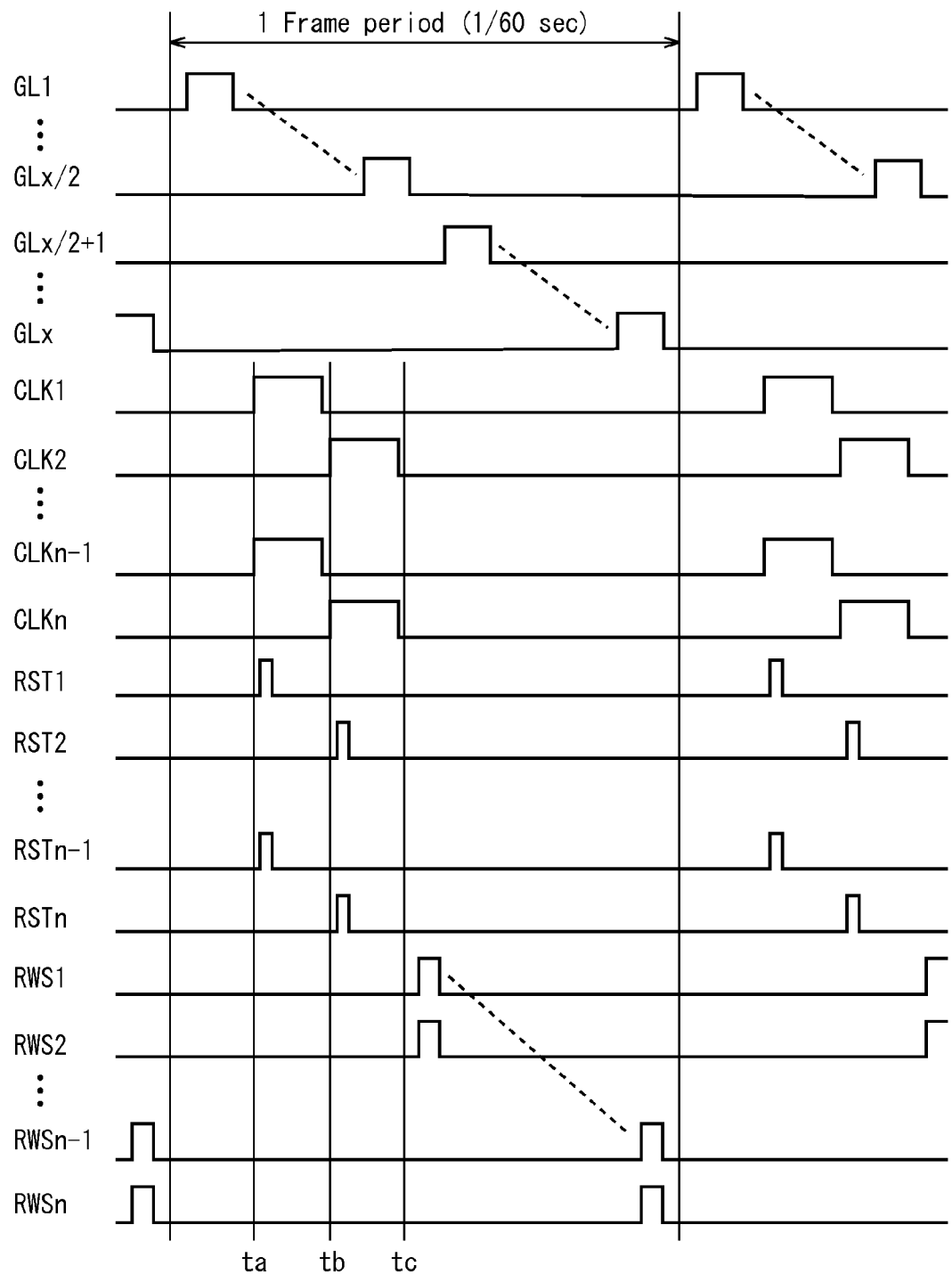
FIG. 4 is a waveform diagram showing signals of the display panel of the display device shown in FIG. 1.

FIG. 4 is a waveform diagram showing signals of the display panel 2 for performing driving at the timings in FIG. 3. As shown in FIG. 4, the potentials of the gate lines GL1 to GLx successively rise to the high level one time for a predetermined time period in one frame period. The potentials of the odd-numbered clock lines CLK1 to CLKn−1 rise to the high level one time in the period A1 (more specifically, from the time to to a little before the time tb) in one frame period. The potentials of the even-numbered clock lines CLK2 to CLKn rise to the high level one time in the period A2 (more specifically, from the time tb to a little before the time tc) in one frame period. The potentials of the odd-numbered reset lines RST1 to RSTn−1 rise to the high level one time for a predetermined time period at the start of the period A1 in one frame period. The potentials of the even-numbered reset lines RST2 to RSTn rise to the high level one time for a predetermined time period at the start of the period A2 in one frame period. The readout lines RWS1 to RWSn are paired up, and the potentials of the (n/2) pairs of readout lines successively rise to the high level for a predetermined time period from the time tc onward.

Figure 5:
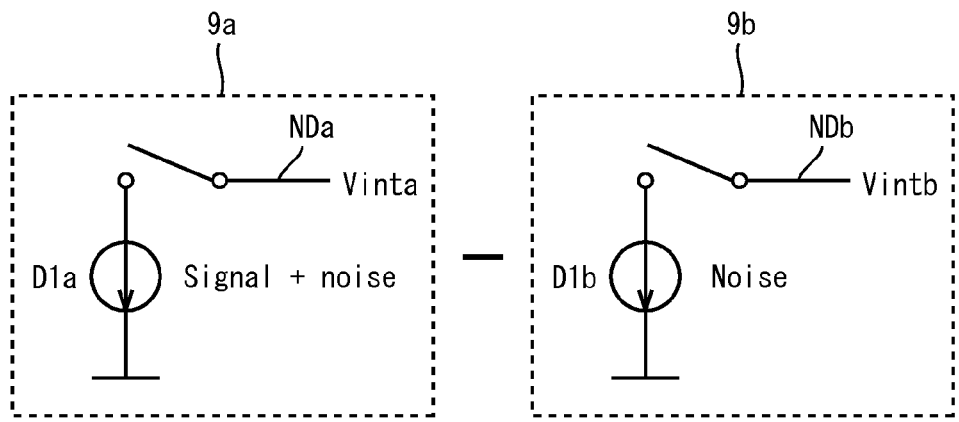
FIG. 5 is a diagram showing schematic configurations of the sensor pixel circuits included in the display device shown in FIG. 1.

FIG. 5 is a diagram showing schematic configurations of the sensor pixel circuits 9. As shown in FIG. 5, the first sensor pixel circuit 9a includes one photodiode D1a and one accumulation node NDa. The photodiode D1a extracts, from the accumulation node NDa, a charge that corresponds to the amount of light that entered while the backlight 3 was lit (signal+noise). Similarly to the first sensor pixel circuit 9a, the second sensor pixel circuit 9b includes one photodiode D1b and one accumulation node NDb. The photodiode D1b extracts, from the accumulation node NDb, a charge that corresponds to the amount of light that entered while the backlight 3 was extinguished (noise). A sensor signal that corresponds to the amount of light that entered in the detection period when the backlight 3 was lit is read out from the first sensor pixel circuit 9a. A sensor signal that corresponds to the amount of light that entered in the detection period when the backlight 3 was extinguished is read out from the second sensor pixel circuit 9b. As described above, the difference between the output signal of the first sensor pixel circuit 9a and the output signal of the second sensor pixel circuit 9b is obtained by the difference circuit included in the source driver circuit 6, thus enabling obtaining the difference between the amount of light when the backlight was lit and the amount of light when the backlight was extinguished.

Note that any number of sensor pixel circuits 9 may be provided in the pixel region 4. However, it is preferable that the first sensor pixel circuits 9a and the second sensor pixel circuits 9b are connected to different output lines. For example, in the case of providing (n×m) sensor pixel circuits 9 in the pixel region 4, it is sufficient to connect the odd-numbered output lines OUT1 to OUTm−1 to the n first sensor pixel circuits 9a respectively, and connect the even-numbered output lines OUT2 to OUTm to the n second sensor pixel circuits 9b respectively. In this case, readout from the sensor pixel circuits 9 is performed one row at a time. Alternatively, the same number of sensor pixel circuits 9 as the number of color pixels (i.e., (x×y/3) sensor pixel circuits) may be provided in the pixel region 4. As another alternative, a smaller number of sensor pixel circuits 9 than the number of color pixels (e.g., up to 1/10th the number of color pixels) may be provided in the pixel region 4.

In this way, the display device of this embodiment of the present invention is a display device in which multiple photodiodes (photosensors) are arranged in the pixel region 4, the display device including: the display panel 2 that includes multiple display pixel circuits 8 and multiple sensor pixel circuits 9, and a sensor row driver circuit 7 (driver circuit) that outputs, to the sensor pixel circuits 9, a clock signal CLK (control signal) that indicates a detection period when the backlight is lit and a detection period when the backlight is extinguished. The following describes details of the sensor pixel circuits 9 that are included in this display device. In the following description, the sensor pixel circuits are referred to as pixel circuits, and the signals on the various signal lines are given the same names as their signal lines to identify them (e.g., the signal on a clock line CLKa is referred to as the clock signal CLKa).

The first sensor pixel circuit 9a is connected to a clock line CLKa, a reset line RSTa, a readout line RWSa, a power supply line VDDa, and an output line OUTa. The second sensor pixel circuit 9b is connected to a clock line CLKb, a reset line RSTb, a readout line RWSb, a power supply line VDDb, and an output line OUTb. In these embodiments, the second sensor pixel circuit 9b has the same configuration as the first sensor pixel circuit 9a and operates in a similar manner, and therefore descriptions regarding the second sensor pixel circuit 9b will not be given as appropriate.

Figure 6:
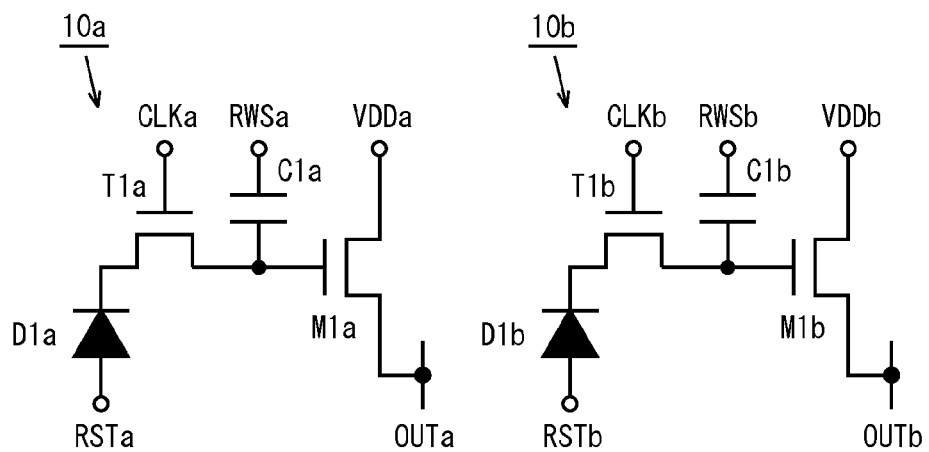
FIG. 6 is a circuit diagram showing sensor pixel circuits according to a first embodiment of the present invention.

FIG. 6 is a circuit diagram showing an example of a specific configuration of the first sensor pixel circuit 9a and the second sensor pixel circuit 9b. In the present embodiment, a first pixel circuit 10a shown in FIG. 6 is a specific example of the previously-mentioned first sensor pixel circuit 9a, and a second pixel circuit 10b is a specific example of the second sensor pixel circuit 9b. As shown in FIG. 6, the first pixel circuit 10a includes transistors T1a and M1a, a photodiode D1a, and a capacitor C1a. The second pixel circuit 10b includes transistors T1b and M1b, a photodiode D1b, and a capacitor C1b. The transistors T1a, M1a, T1b, and M1b are N-type TFTs (Thin Film Transistors).

In the first pixel circuit 10a, the anode of the photodiode D1a is connected to the reset line RSTa, and the cathode is connected to the source of the transistor T1a. The gate of the transistor T1a is connected to the clock line CLKa, and the drain is connected to the gate of the transistor M1a. The drain of the transistor M1a is connected to the power supply line VDDa, and the source is connected to the output line OUTa. The capacitor C1a is provided between the gate of the transistor M1a and the readout line RWSa. In the first pixel circuit 10a, the node that is connected to the gate of the transistor M1a is an accumulation node for accumulating a charge that corresponds to the detected amount of light, and the transistor M1a functions as a readout transistor. The second pixel circuit 10b has the same configuration as the first pixel circuit 10a.

Figure 7:
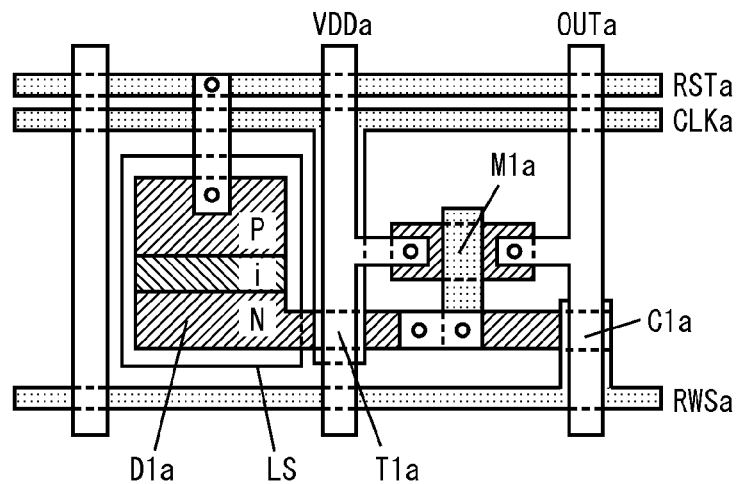
FIG. 7 is a diagram showing a layout of a sensor pixel circuit shown in FIG. 6.

FIG. 7 is a diagram showing the layout of the first pixel circuit 10a. As shown in FIG. 7, the first pixel circuit 10a is configured by forming a light shielding film LS, a semiconductor layer (hatched portion), a gate wiring layer (dotted portion), and a source wiring layer (solid white portion) in the stated order on a glass substrate. Contacts (indicated by white circles) are provided at places where the semiconductor layer and the source wiring layer are to be connected and places where the gate wiring layer and the source wiring layer are to be connected. The transistors T1a and M1a are formed by arranging the semiconductor layer and the gate wiring layer so as to intersect each other. The photodiode D1a is formed by arranging P layer, I layer, and N layer semiconductor layers in a line. The capacitor C1a is formed by arranging the semiconductor layer and the gate wiring layer so as to overlap each other. The light shielding film LS is formed from metal and prevents light that enters from the underside of the substrate from entering the photodiode D1a. The layout of the second pixel circuit 10b is similar to that of the first pixel circuit 10a. Note that the first and second pixel circuits 10a and 10b may have different layouts from those described above.

Figure 8:
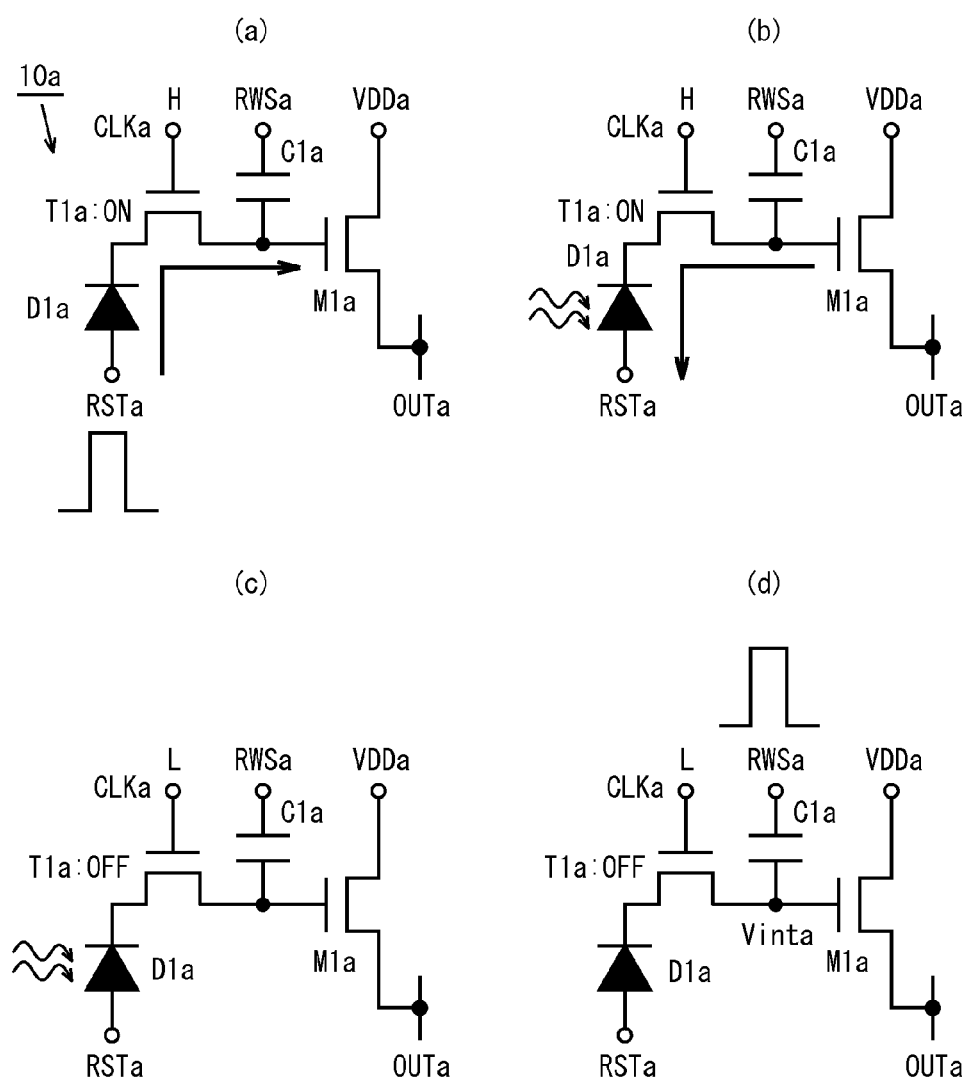
FIG. 8 is a diagram showing operations of a sensor pixel circuit shown in FIG. 6.

FIG. 8 is a diagram showing operations of the first pixel circuit 10a in the case of being driven by the signals shown in FIG. 4. As shown in FIG. 8, the first pixel circuit 10a performs (a) resetting, (b) accumulation, (c) holding, and (d) readout in one frame period.

Figure 9:
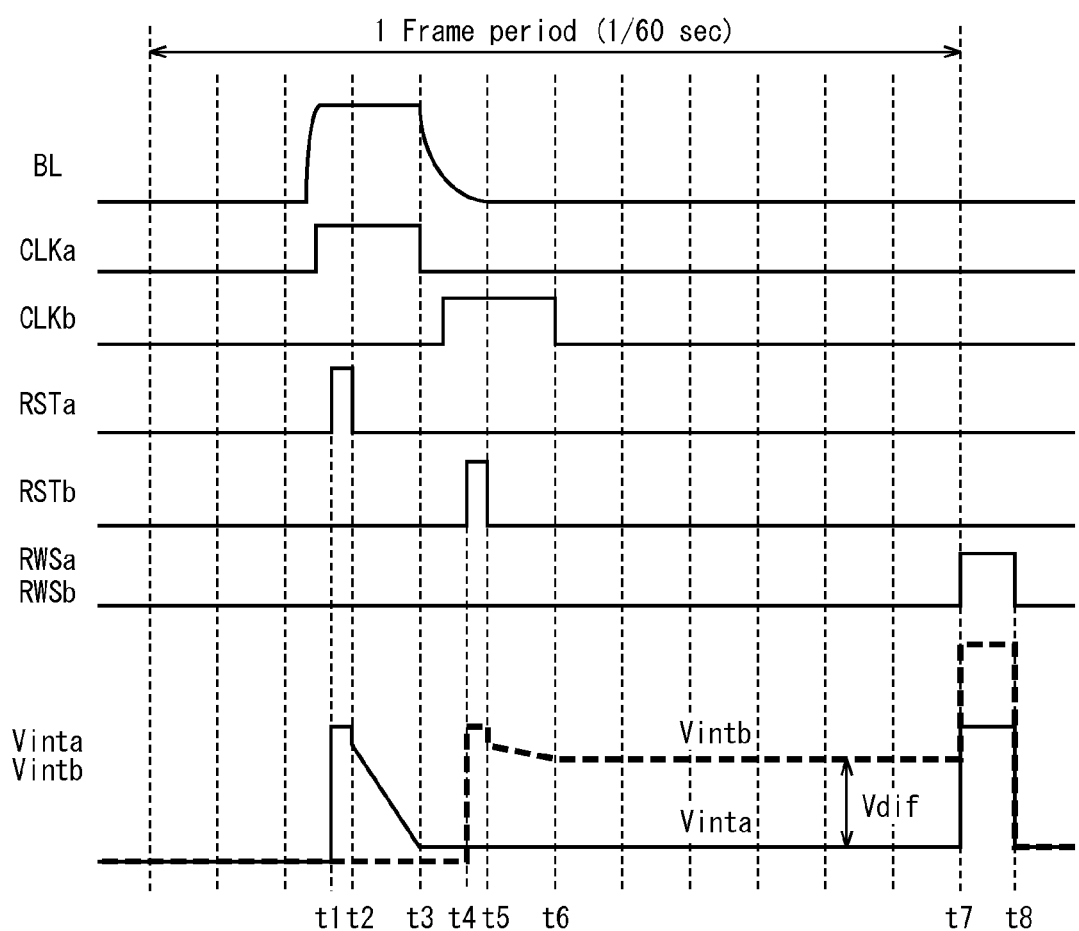
FIG. 9 is a waveform diagram showing signals of the sensor pixel circuits shown in FIG. 6.

FIG. 9 is a waveform diagram showing signals of the first pixel circuit 10a and the second pixel circuit 10b in the case of being driven by the signals shown in FIG. 4. In FIG. 9, BL represents the brightness of the backlight 3, Vinta represents the potential of the accumulation node of the first pixel circuit 10a (gate potential of the transistor M1a), and Vintb represents the potential of the accumulation node of the second pixel circuit 10b (gate potential of the transistor M1b). In the case of the first pixel circuit 10a, the reset period is from a time t1 to a time t2, the accumulation period is from the time t2 to a time t3, the holding period is from the time t3 to a time t7, and the readout period is from the time t7 to a time t8. In the case of the second pixel circuit 10b, the reset period is from a time t4 to a time t5, the accumulation period is from the time t5 to a time t6, the holding period is from the time t6 to a time t7, and the readout period is from the time t7 to the time t8.

In the reset period of the first pixel circuit 10a, the clock signal CLKa is at the high level, the readout signal RWSa is at the low level, and the reset signal RSTa is at the reset high level. At this time, the transistor T1a switches on. Accordingly, current (the forward current of the photodiode D1a) flows from the reset line RSTa to the accumulation node via the photodiode D1a and the transistor T1a ((a) in FIG. 8), and the potential Vinta is reset to a predetermined level.

In the accumulation period of the first pixel circuit 10a, the clock signal CLKa is at the high level, and the reset signal RSTa and the readout signal RWSa are at the low level. At this time, the transistor T1a switches on. When light enters the photodiode D1a at this time, current (photocurrent of the photodiode D1a) flows from the accumulation node to the reset line RSTa via the transistor T1a and the photodiode D1a, and charge is extracted from the accumulation node ((b) in FIG. 8). Accordingly, the potential Vinta drops according to the amount of light that entered in the period for which the clock signal CLKa was at the high level (the lit period of the backlight 3).

In the holding period of the first pixel circuit 10a, the clock signal CLKa, the reset signal RSTa and the readout signal RWSa are at the low level. At this time, the transistor T1a switches off. Even if light enters the photodiode D1a at this time, the potential Vinta does not change since the transistor T1a is switched off and the photodiode D1a and the gate of the transistor M1 are electrically cut-off from each other ((c) in FIG. 8).

In the readout period of the first pixel circuit 10a, the clock signal CLKa and the reset signal RSTa are at the low level, and the readout signal RWSa is at the readout high level. At this time, the transistor T1a switches off. At this time, the potential Vinta rises by a multiple of the amount of rise in the potential of the readout signal RWSa (Cqa/Cpa) (note that Cpa is the overall capacitance value of the first pixel circuit 10a, and Cqa is the capacitance value of the capacitor C1a). The transistor M1a forms a source follower amplification circuit whose load is a transistor (not shown) included in the source driver circuit 6, and drives the output line OUTa according to the potential Vinta ((d) in FIG. 8).

The second pixel circuit 10b operates similarly to the first pixel circuit 10a. The potential Vintb is reset to a predetermined level in the reset period, drops in the accumulation period according to the amount of light that entered in the period for which the clock signal CLKb was at the high level (extinguished period of the backlight 3), and does not change in the holding period. In the readout period, the potential Vintb rises by a multiple of the amount of rise in the potential of the readout signal RWSb (Cqb/Cpb) (note that Cpb is the overall capacitance value of the second pixel circuit 10b, and Cqb is the capacitance value of the capacitor C1b), and the transistor M1b drives the output line OUTb according to the potential Vintb.

As described above, the first pixel circuit 10a of the present embodiment includes one photodiode D1a (photosensor), one accumulation node that accumulates a charge that corresponds to the detected amount of light, the transistor M1a (readout transistor) that has a control terminal connected to the accumulation node, and the transistor T1a (switching element for holding) that is provided on the path of current that flows in the photodiode D1a and switches on/off according to the clock signal CLK. The transistor T1a is provided between the accumulation node and one end of the photodiode D1a, and the other end of the photodiode D1a is connected to the reset line RSTa. The transistor T1a switches on in a detection period when the backlight is lit in accordance with the clock signal CLKa. The second pixel circuit 10b has a configuration similar to that of the first pixel circuit 10a, and the transistor T1b included in the second pixel circuit 10b switches on in a detection period when the backlight is extinguished.

In this way, the transistor T1a that switches on in a detection period when the backlight is lit is provided on the path of current that flows in the photodiode D1a, and the transistor T1b that switches on in a detection period when the backlight is extinguished is provided on the path of current that flows in the photodiode D1b. This enables configuring the first pixel circuit 10a that detects light in a detection period when the backlight is lit and holds the detected amount of light when not in that period, and the second pixel circuit 10b that detects light in a detection period when the backlight is extinguished and holds the detected amount of light when not in that period.

This enables separately detecting the amount of light when the backlight is lit and the amount of light when the backlight is extinguished using the first and second pixel circuits 10a and 10b, and obtaining the difference between them outside the pixel circuits. This enables providing an input function that is not dependent on the light environment.

Also, the first and second pixel circuits 10a and 10b respectively further include the capacitors C1a and C1b that are provided between the accumulation node and the readout lines RWSa and RWSb. Accordingly, by applying a readout potential to the readout lines RWSa and RWSb, it is possible to change the potentials of the accumulation nodes and read out signals that correspond to the detected amounts of light from the first and second pixel circuits 10a and 10b.

Also, the display panel 2 further includes multiple output lines OUT1 to OUTm that transmit output signals of the first and second pixel circuits 10a and 10b, and the first pixel circuit 10a and the second pixel circuit 10b are connected to different output lines according to their type. Accordingly, readout from the first and second pixel circuits 10a and 10b can be performed in parallel, thus enabling reducing the readout speed and reducing the power consumption of the device.

Note that in addition to the sensor drive mode that was described above with reference to FIGS. 4 and 9, the display device of the present embodiment has, as operation modes, two types of correction data acquisition modes (a first correction data acquisition mode and a second correction data acquisition mode) for correcting offset error of the first pixel circuit 10a and the second pixel circuit 10b respectively.

Figure 10:
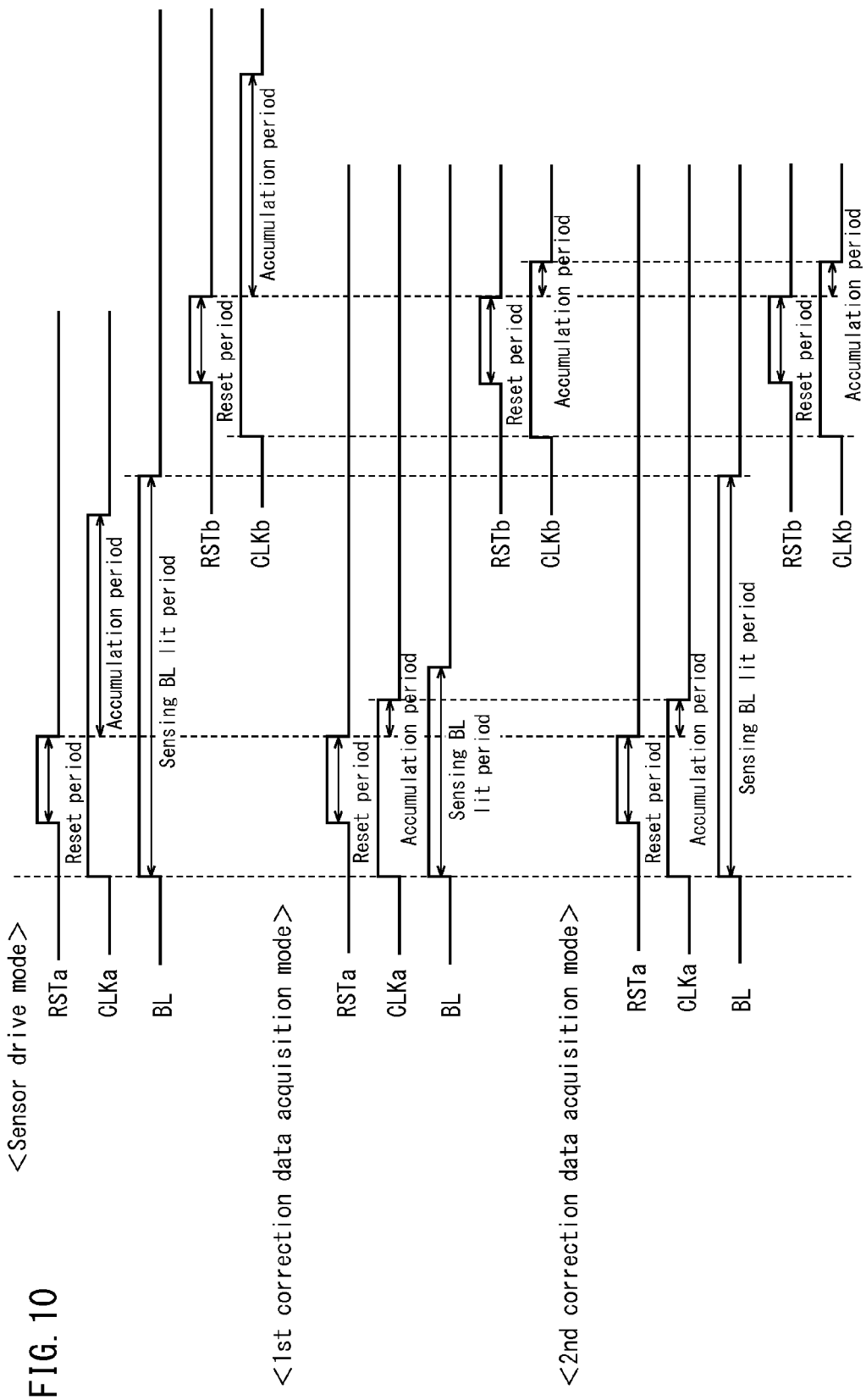
FIG. 10 is a timing chart showing an example of drive signals in a sensor drive mode, drive signals in a first correction data acquisition mode, and drive signals in a second correction data acquisition mode.

FIG. 10 is a timing chart showing drive signals in the sensor drive mode, drive signals in the first correction data acquisition mode, and drive signals in the second correction data acquisition mode. As shown in FIG. 10, the time at which the reset signal rises to the high level and the duration for which it is at the high level in one frame period are the same in the sensor drive mode, the first correction data acquisition mode and the second correction data acquisition mode. However, the duration of the clock signal and the duration of the sensing backlight lit period are different between the modes.

With the display device of the present embodiment, normally sensor signals are read out from the first and second pixel circuits 10a and 10b in the sensor drive mode, and correction data is acquired by performing operations in the first correction data acquisition mode and the second correction data acquisition mode shown in FIG. 10 at predetermined timings. Specifically, with the display device of the present embodiment, a frame for operating in the first correction data acquisition mode and a frame for operating in the second correction data acquisition mode are appropriately provided among one or more frames for operating in the sensor drive mode. The frame for operating in the first correction data acquisition mode and the frame for operating in the second correction data acquisition mode may be provided at any frequency. The frame for the first correction data acquisition mode and the frame for the second correction data acquisition mode may be consecutive, or one or more frames for the sensor drive mode may be provided therebetween. Also, the frame for the second correction data acquisition mode may be arranged before the frame for the first correction data acquisition mode.

In the readout period of the sensor drive mode, as previously described, output that corresponds to the potential Vinta is obtained from the first pixel circuit 10a, and output that corresponds to the potential Vintb is obtained from the second pixel circuit 10b. In the readout period of the frame for the first correction data acquisition mode, first correction data $B_{1st}$ for correcting offset of the first pixel circuit 10a in the sensor drive mode is obtained from the first pixel circuit 10a. In the readout period of the frame for the second correction data acquisition mode, second correction data $B_{2nd}$ for correcting offset of the second pixel circuit 10b in the sensor drive mode is obtained from the second pixel circuit 10b.

As shown in FIG. 10, the timings of the rise in the clock signals CLKa and CLKb in one frame period are the same in the sensor drive mode, the first correction data acquisition mode and the second correction data acquisition mode. Also, in each mode, the duration of the period for which the clock signal CLKa is at the high level is the same as the duration of the period for which the clock signal CLKb is at the high level.

Also, the durations of the periods for which the clock signal CLKa is at the high level in the first correction data acquisition mode and the second correction data acquisition mode are shorter than the duration of the period for which the clock signal CLKa is at the high level in the sensor drive mode. In other words, the durations of the accumulation periods in the first correction data acquisition mode and the second correction data acquisition mode are shorter than the duration of the accumulation period in the sensor drive mode.

Figure 11:
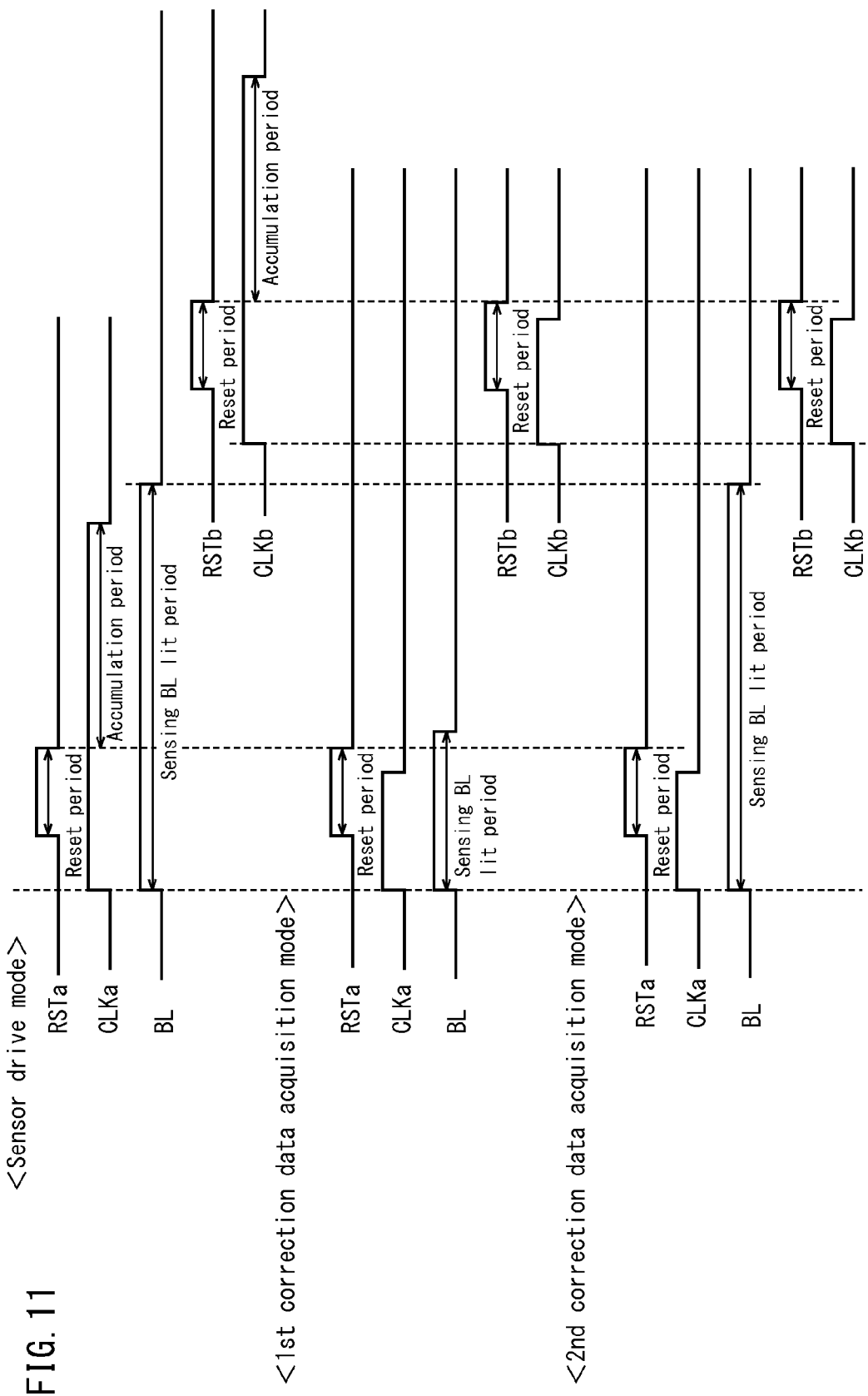
FIG. 11 is a timing chart showing another example of drive signals in the sensor drive mode, drive signals in the first correction data acquisition mode, and drive signals in the second correction data acquisition mode.

Also, it is desirable that the durations of the accumulation periods in the first correction data acquisition mode and the second correction data acquisition mode are substantially zero such that there is no influence from photocurrent due to external light or the like. More specifically, as shown in FIG. 10, after the reset signal RSTa switches from the high level to the low level, the clock signal CLKa may switch from the high level to the low level. Note that in this case, the durations of the accumulation periods need only have the duration of a predetermined margin period in order to prevent a reversal in the sequence of the fall of the reset signal RSTa (switch from the high level to the low level) and the fall of the clock signal CLKa due to variation in the signal timings. For example, it is desirable that the accumulation periods in this case have a short duration of approximately several microseconds, depending on the design. Alternatively, a configuration is possible in which, as shown in FIG. 11, the RST signal RSTa falls after the clock signal CLKa falls in the first correction data acquisition mode and the second correction data acquisition mode. In this case, the durations of the accumulation periods are effectively zero.

Also, in the example of FIG. 10, in all of the modes, the lighting of the sensing backlight starts in synchronization with the rise of the clock signal CLKa. Note that there is no limitation to this, and the clock signal CLKa may rise after the start of the lighting of the backlight or before it. However, it is preferable that in this case, the duration of the period from the start of the lighting of the backlight to the rise of the clock signal CLKa is the same in the sensor drive mode and the first correction data acquisition mode.

It is desirable that the duration of the backlight lit period is the same in the case of the sensor drive mode and the case of the second correction data acquisition mode. On the other hand, the duration of the backlight lit period in the first correction data acquisition mode is shorter than that of the backlight lit periods in the sensor drive mode and the second correction data acquisition mode. In other words, the duration of the period from the end of the accumulation period to the extinguishing of the backlight in the first correction data acquisition mode is shorter than the duration of the period from the end of the accumulation period to the extinguishing of the backlight in the sensor drive mode.

In the sensor drive mode, the backlight is extinguished at the time when a predetermined time period has elapsed since the fall of the clock signal CLKa (i.e., since the end of the accumulation period). It is preferable that in the first correction data acquisition mode as well, the backlight is extinguished at the time when the same time period as the aforementioned predetermined time period has elapsed since the fall of the clock signal CLKa.

As described above, in the first correction data acquisition mode, the first correction data $B_{1st}$ for correcting offset of the first pixel circuit 10$a$ in the sensor drive mode is obtained from the first pixel circuit 10$a$. In the second correction data acquisition mode, the second correction data $B_{2nd}$ for correcting offset of the second pixel circuit 10$b$ in the sensor drive mode is obtained from the second pixel circuit 10$b$.

Note that the state of charge accumulation in the accumulation period in the backlight lit period is influenced by the duration of the backlight lit period that comes before the reset period. In the present embodiment, as previously described, the duration of the backlight lit period that comes before the reset period is set the same in the case of the sensor drive mode and the case of the first correction data acquisition mode. Accordingly, the influence of the duration of the backlight lit period that comes before the reset period can be set to the same condition in the case of the sensor drive mode and the case of the first correction data acquisition mode.

Figure 12:
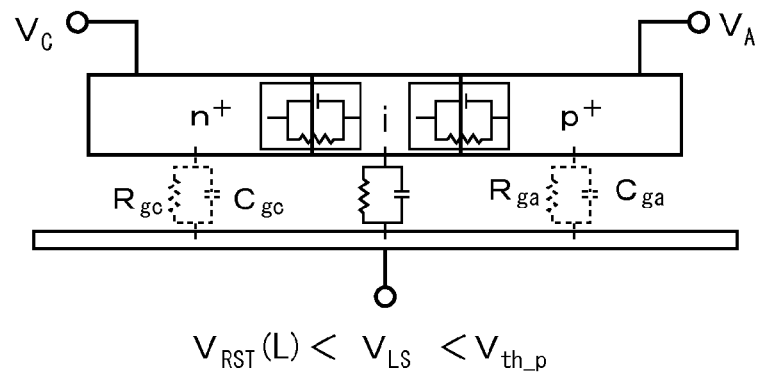
FIG. 12 is a schematic cross-sectional view of a diode.

The following describes the reason why the state of charge accumulation in the accumulation period in the backlight lit period is influenced by the duration of the backlight lit period that comes before the reset period, with reference to FIG. 12 and the like.

FIG. 12 is a schematic cross-sectional view of the diode D1$a$. As shown in FIG. 12, in the case where the light shielding film LS is provided in the vicinity of a lateral-structure PIN diode as with the diode D1$a$ of the present embodiment, the diode functions as a three-terminal element due to a parasitic capacitor that is formed between the diode and the light shielding film LS. Specifically, the light shielding film LS acts as the gate, the p layer acts as the anode, and the n layer acts as the cathode, and three mutually different operation modes are exhibited depending on the relationship between a gate (i.e., light shielding film LS) potential $V_{LS}$, an anode potential $V_A$, and a cathode potential $V_C$.

Figure 13:
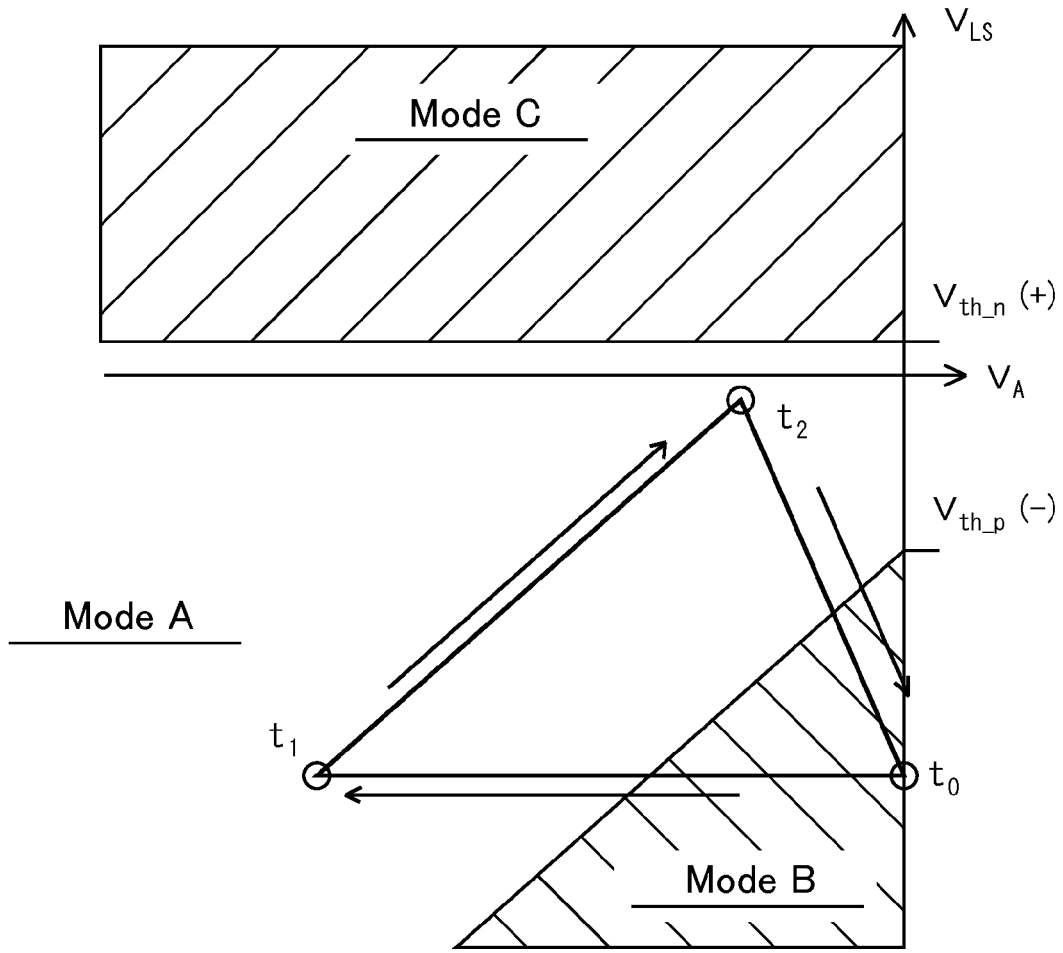
FIG. 13 is a diagram showing distributions of diode modes A, B, and C in terms of a relationship between an anode potential $V_A$ and a potential $V_{LS}$ of a light shielding film LS.

Here, FIG. 13 shows distributions of modes A, B, and C in terms of the relationship between the anode potential VA and the light shielding film LS potential $V_{LS}$. In FIG. 13, the region without hatching indicates the mode A, the region with hatching that slopes downward to the right indicates the mode B, and the region with hatching that slopes downward to the left indicates the mode C. As described above, the mode A region can be expressed as follows.

$$V_A + V_{th\_p} \leq V_{LS} \leq V_C + V_{th\_n}$$

The mode B region can be expressed as follows.

$$V_{LS} \leq V_A + V_{th\_p}$$

The mode C region can be expressed as follows.

$$V_C + V_{th\_n} \leq V_{LS}$$

Among t0, t1, and t2 shown in FIG. 13, t0 indicates coordinates representing $V_{LS}$ and $V_A$ at the time when the reset signal RST rises to the high level. Also, t1 corresponds to the time when the reset signal RSTa switches from the high level to the low level, and t2 corresponds to the time when the clock signal CLKa switches from the high level to the low level.

Figure 14A:
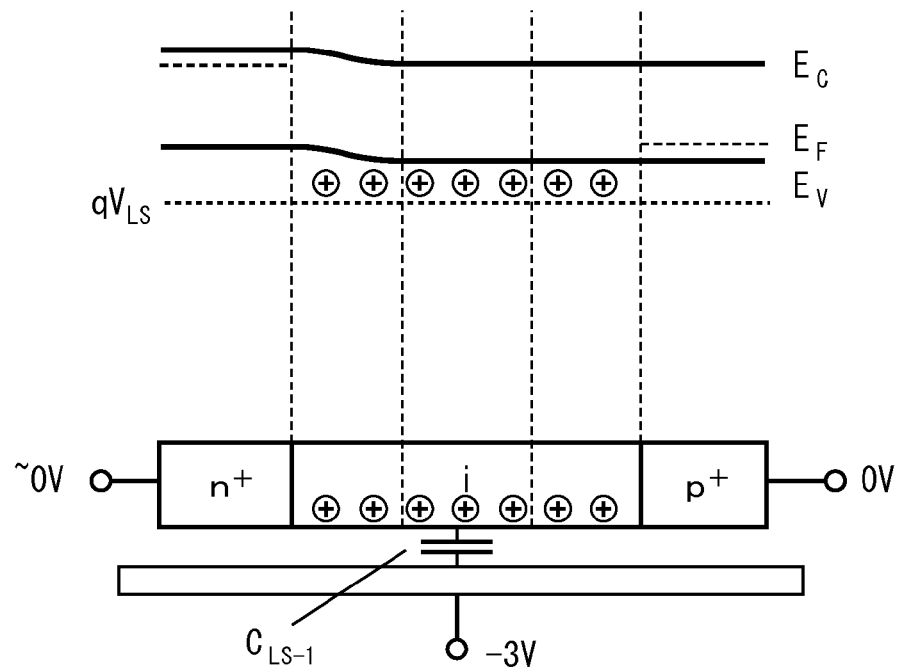
FIG. 14A is a schematic diagram showing a diode charge distribution in the state of mode B.
Figure 14B:
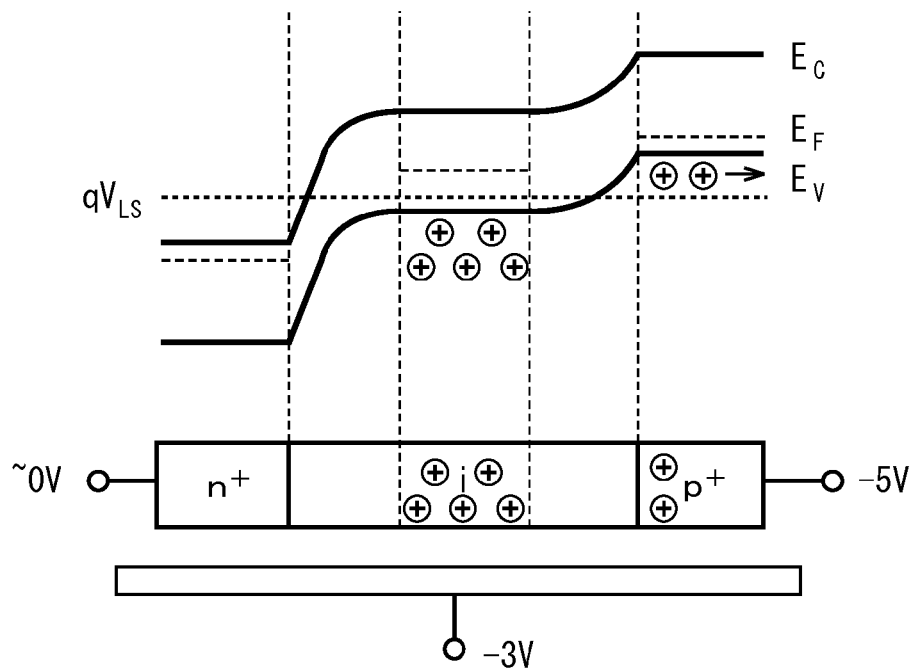
FIG. 14B is a schematic diagram showing a diode charge distribution in the state of mode A.

As can be understood from FIG. 13, the diode D1$a$ is in the mode B state at the time when the reset signal RSTa rises to the high level (when resetting starts, which is the time t0). When in the mode B state, holes are accumulated in the i layer of the diode D1$a$ as shown in FIG. 14A. When the reset signal RSTa switches to the low level (i.e., at the time t1), the diode D1$a$ enters the mode A state, and holes are trapped in the i layer as shown in FIG. 14B. Accordingly, in the reset period, the diode D1$a$ enters the mode B state shown in FIG. 14A, and is influenced by light that entered from the backlight immediately before the reset period. In other words, if there is a change in the state of transmitted light from the backlight or reflected light on the diode D1$a$ immediately before the reset period, there is a change in the state of charge accumulation in the diode D1$a$ as well. Accordingly, the reset level and the reset field-through amount of the diode D1$a$ are dependent on the condition of backlight lighting immediately before the reset period.

In light of these circumstances, in the present embodiment, the duration of the backlight lit period that comes before the reset period is set the same in the sensor drive mode and the first correction data acquisition mode, as shown in FIG. 10. Accordingly, the first correction data $B_{1st}$ for correcting offset of the first pixel circuit 10$a$ in the sensor drive mode is obtained in the first correction data acquisition mode under the condition that the reset level and the reset field-through amount of the diode D1$a$ are the same as in the case of the sensor drive mode.

Also, in the case shown in FIG. 10, the period from the end of the accumulation period to the extinguishing of the backlight is set the same in the case of the sensor drive mode and the case of the first correction data acquisition mode. This is done such that the influence of leakage of the transistor T1$a$, which is caused by light from the backlight entering the diode D1$a$, in the period from the end of the accumulation period to the extinguishing of the backlight is the same in the case of the sensor drive mode and the case of the first correction data acquisition mode. In other words, even after the clock signal CLKa falls to the low level and the accumulation period ends, light from the backlight passes through the light shielding film LS and is reflected by constituent members in the panel while the backlight is lit, and thus there is a component of light that enters the transistor T1$a$. Accordingly, by setting the duration of the period from the end of the accumulation period to the extinguishing of the backlight the same in the case of the sensor drive mode and the case of the first correction data acquisition mode as shown in FIG. 10, the influence of leakage of the transistor T1$a$ can be set to the same condition in both of these modes. Accordingly, the first correction data $B_{1st}$ for correcting offset of the first pixel circuit 10$a$ in the sensor drive mode can be obtained in the first correction data acquisition mode under the condition that leakage of the transistor T1a is the same as in the case of the sensor drive mode.

Also, in the second correction data acquisition mode, the second correction data $B_{2nd}$ for correcting offset of the second pixel circuit 10b in the sensor drive mode is obtained as output of the second pixel circuit 10b. In the present embodiment, in the second correction data acquisition mode, the timing and duration of the backlight lit period in one frame period in the second correction data acquisition mode are the same as those of the lit period in the case of the sensor drive mode, as shown in FIG. 10. Accordingly, the condition of backlight lighting immediately before the reset period (the period for which the reset signal RSTb is at the high level) of the second pixel circuit 10b is the same as that in the sensor drive mode, and as described above with reference to FIGS. 12 to 14B, the second correction data $B_{2nd}$ for correcting offset of the second pixel circuit 10b in the sensor drive mode can be obtained in the second correction data acquisition mode under the condition that the reset level and the reset field-through amount of the diode D1b are the same as in the case of the sensor drive mode.

The signal processing circuit 20 corrects sensor output that was obtained in the sensor drive mode, using the first correction data $B_{1st}$ and the second correction data $B_{2nd}$ that were obtained as described above. The following describes specific examples of this correction processing. Note that although it is assumed that the following correction processing is performed by the signal processing circuit 20, a configuration is also possible in which it is performed by an arithmetic circuit provided in the source driver circuit 6.

First Specific Example of Correction

In the first specific example of correction, letting B indicate the photosensor signal level obtained from the second pixel circuit 10b in the sensor drive mode, the signal processing circuit 20 uses the following to obtain a corrected photosensor signal level R' from a photosensor signal level R obtained from the first pixel circuit 10a in the sensor drive mode.

$$R'=(R-B_{1st})-(B-B_{2nd})$$

This correction enables eliminating offset of the first pixel circuit 10a and the second pixel circuit 10b and obtaining highly precise sensor output. Also, eliminating offset has an advantage of enabling an increase in the dynamic range of the sensor output.

Second Specific Example of Correction

In the second specific example of correction, in the first correction data acquisition mode, a gain correction photosensor signal level $W_{1st}$ is obtained by supplying a readout pulse whose amplitude is smaller than that in the sensor drive mode (the amplitude may be zero). Also, in the second correction data acquisition mode, a gain correction photosensor signal level $W_{2nd}$ is acquired by supplying a readout pulse whose amplitude is smaller than that in the sensor drive mode (the amplitude may be zero).

Then, letting L indicate the number of photosensor signal levels, the following is used to obtain a corrected photosensor signal level R' from a photosensor signal level R obtained from the first pixel circuit 10a in the sensor drive mode.

$$R'=L\times\{R/(W_{1st}-B_{1st})-B/(W_{2nd}-B_{2nd})\}$$

This correction enables correcting the gain of the first pixel circuit 10a and the second pixel circuit 10b. This has an advantage of enabling an increase in the dynamic range of the sensor output Third Specific Example of Correction In the third specific example of correction, using the photosensor signal level B obtained from the second pixel circuit 10b in the sensor drive mode, the gain correction photosensor signal level $W_{1st}$ and the gain correction photosensor signal level $W_{2nd}$, and the number of photosensor signal levels L, the following is used to obtain the corrected photosensor signal level R' from the photosensor signal level R obtained from the first pixel circuit 10a in the sensor drive mode.

$$R'=L\times\{(R-B_{1st})/(W_{1st}-B_{1st})-(B-B_{2nd})/(W_{2nd}-B_{2nd})\}$$

Accordingly, correcting both offset and gain enables obtaining sensor output that is highly precise and has a wide dynamic range.

Second Embodiment

Figure 15:
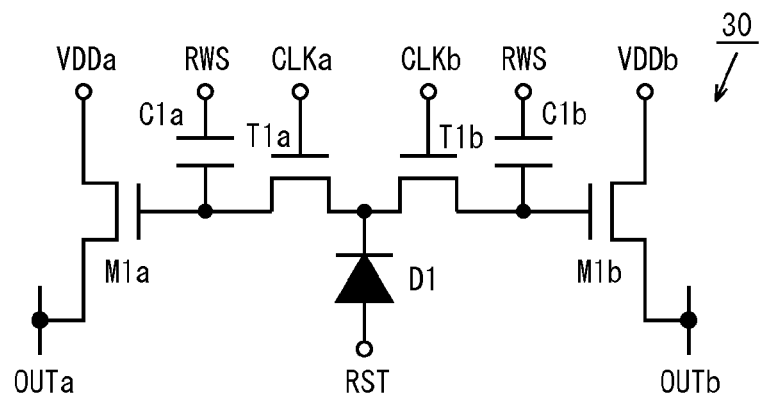
FIG. 15 is a circuit diagram showing a sensor pixel circuit according to a second embodiment of the present invention.

FIG. 15 is a circuit diagram showing a sensor pixel circuit according to a second embodiment of the present invention. A pixel circuit 30 shown in FIG. 15 includes transistors T1a, T1b, M1a, and M1b, a photodiode D1, and capacitors C1a and C1b. The transistors T1a, T1b, M1a, and M1b are N-type TFTs. In FIG. 15, the left half corresponds to a first pixel circuit and the right half corresponds to a second pixel circuit. The pixel circuit 30 is connected to clock lines CLKa and CLKb, a reset line RST, a readout line RWS, power supply lines VDDa and VDDb, and output lines OUTa and OUTb.

Figure 16:
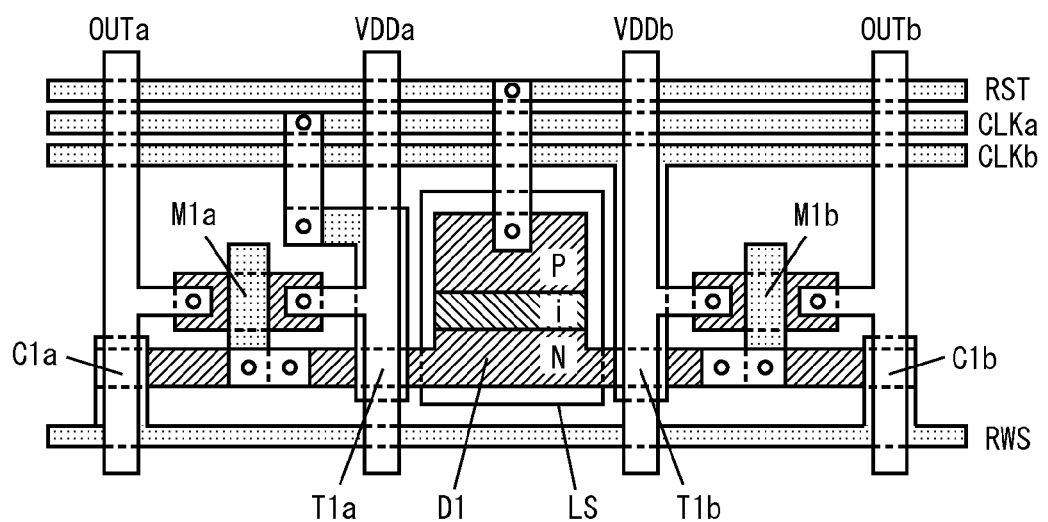
FIG. 16 is a diagram showing a layout of the sensor pixel circuit shown in FIG. 15.

As shown in FIG. 15, the anode of the photodiode D1 is connected to the reset line RST, and the cathode is connected to the sources of the transistor T1a and T1b. The gate of the transistor T1a is connected to the clock line CLKa, and the drain is connected to the gate of the transistor M1a. The drain of the transistor M1a is connected to the power supply line VDDa, and the source is connected to the output line OUTa. The capacitor C1a is provided between the gate of the transistor M1a and the readout line RWS. The gate of the transistor T1b is connected to the clock line CLKb, and the drain is connected to the gate of the transistor M1b. The drain of the transistor M1b is connected to the power supply line VDDb, and the source is connected to the output line OUTb. The capacitor C1b is provided between the gate of the transistor M1b and the readout line RWS. In the pixel circuit 30, the node that is connected to the gate of the transistor M1a is a first accumulation node, the node that is connected to the gate of the transistor M1b is a second accumulation node, and the transistors M1a and M1b function as readout transistors. FIG. 16 is a diagram showing the layout of the pixel circuit 30. A description given with reference to FIG. 16 would be the same as that in the first embodiment.

Figure 17:
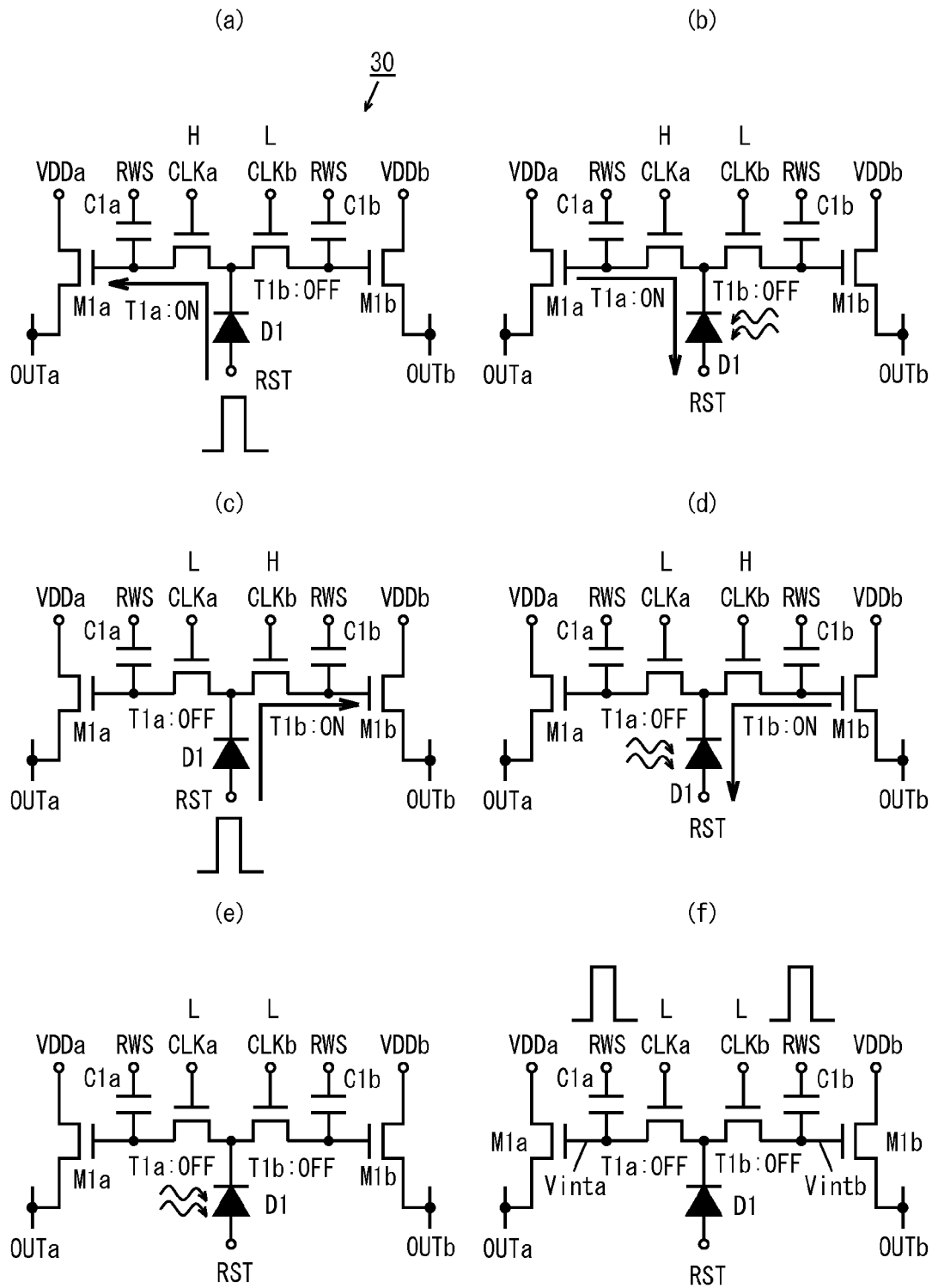
FIG. 17 is a diagram showing operations of the sensor pixel circuit shown in FIG. 15.

FIG. 17 is a diagram showing operations of the pixel circuit 30 in the sensor drive mode. In the sensor drive mode, the pixel circuit 30 performs (a) resetting when the backlight is lit, (b) accumulation when the backlight is lit, (c) resetting when the backlight is extinguished, (d) accumulation when the backlight is extinguished, (e) holding, and (f) readout in one frame period.

Figure 18:
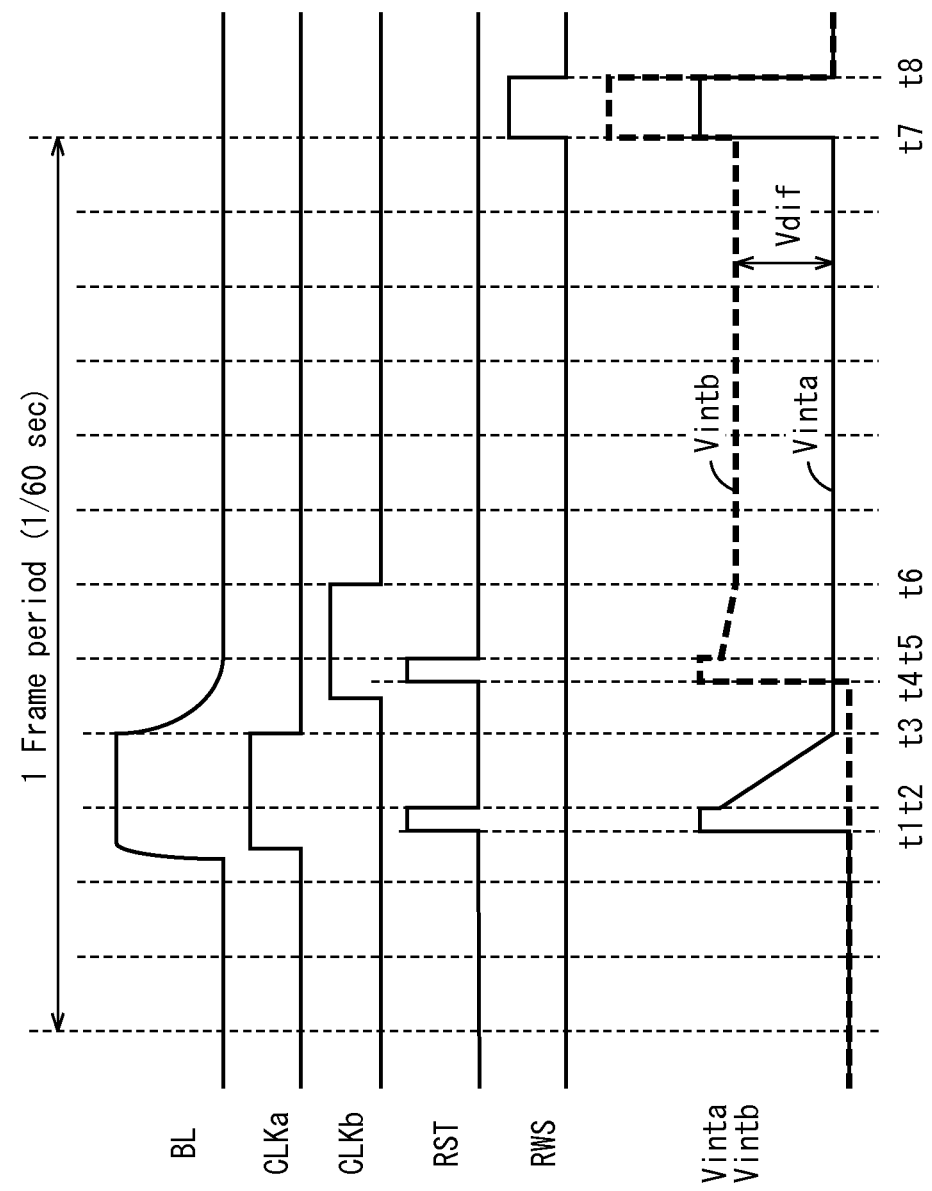
FIG. 18 is a waveform diagram showing signals of the sensor pixel circuit shown in FIG. 15.

FIG. 18 is a waveform diagram showing signals of the pixel circuit 30 in the sensor drive mode. In FIG. 18, Vinta indicates the potential of the first accumulation node (gate potential of the transistor M1a), and Vintb indicates the potential of the second accumulation node (gate potential of the transistor M1b). In FIG. 18, the reset period when the backlight is lit is from a time t1 to a time t2, the accumulation period when the backlight is lit is from the time t2 to a time t3, the reset period when the backlight is extinguished is from a time t4 to a time t5, the accumulation period when the backlight is extinguished is from the time t5 to a time t6, the holding period is from the time t3 to the time t4 and from the time t6 to a time t7, and the readout period is from the time t7 to a time t8.

In the reset period when the backlight is lit, the clock signal CLKa is at the high level, the clock signal CLKb and the readout signal RWS are at the low level, and the reset signal RST is at the reset high level. At this time, the transistor T1a switches on, and the transistor T1b switches off. Accordingly, current (forward current of the photodiode D1) flows from the reset line RST to the first accumulation node via the photodiode D1 and the transistor T1a ((a) in FIG. 17), and the potential Vinta is reset to a predetermined level.

In the accumulation period when the backlight is lit, the clock signal CLKa is at the high level, and the clock signal CLKb, the reset signal RST, and the readout signal RWS are at the low level. At this time, the transistor T1a switches on, and the transistor T1b switches off. When light enters the photodiode D1 at this time, current (photocurrent of the photodiode D1) flows from the first accumulation node to the reset line RST via the transistor T1a and the photodiode D1, and charge is extracted from the first accumulation node ((b) in FIG. 17). Accordingly, the potential Vinta drops according to the amount of light that entered in this period (the lit period of the backlight 3). Note that the potential Vintb does not change in this period.

In the reset period when the backlight is extinguished, the clock signal CLKb is at the high level, the clock signal CLKa and the readout signal RWS are at the low level, and the reset signal RST is at the reset high level. At this time, the transistor T1a switches off, and the transistor T1b switches on. Accordingly, current (forward current of the photodiode D1) flows from the reset line RST to the second accumulation node via the photodiode D1 and the transistor T1b ((c) in FIG. 17), and the potential Vintb is reset to a predetermined level.

In the accumulation period when the backlight is extinguished, the clock signal CLKb is at the high level, and the clock signal CLKa, the reset signal RST, and the readout signal RWS are at the low level. At this time, the transistor T1a switches off, and the transistor T1b switches on. When light enters the photodiode D1 at this time, current (photocurrent of the photodiode D1) flows from the second accumulation node to the reset line RST via the transistor T1b and the photodiode D1, and charge is extracted from the second accumulation node ((d) in FIG. 17). Accordingly, the potential Vintb drops according to the amount of light that entered in this period (the extinguished period of the backlight 3). Note that the potential Vinta does not change in this period.

In the holding period, the clock signals CLKa and CLKb, the reset signal RST, and the readout signal RWS are at the low level. At this time, the transistors T1a and T1b switch off. Even if light enters the photodiode D1 at this time, the potentials Vinta and Vintb do not change since the transistors T1a and T1b are switched off and the photodiode D1 and the gates of the transistors M1a and M1b are electrically cut-off from each other ((e) in FIG. 17).

In the readout period, the clock signals CLKa and CLKb and the reset signal RST are at the low level, and the readout signal RWS is at the readout high level. At this time, the transistors T1a and T1b switch off. At this time, the potentials Vinta and Vintb rise by the amount of rise in the potential of the readout signal RWS, a current Ia that corresponds to the potential Vinta flows between the drain and the source of the transistor M1a, and a current Ib that corresponds to the potential Vintb flows between the drain and the source of the transistor M1b ((f) in FIG. 17). The current Ia is input to the source driver circuit 6 via the output line OUTa, and the current Ib is input to the source driver circuit 6 via the output line OUTb.

As described above, the pixel circuit 30 of the present embodiment has a configuration in which one photodiode D1 (photosensor) is shared between the first and second pixel circuits 10a and 10b of the first embodiment. The cathode of the shared photodiode D1 is connected to the source of the transistor T1a included in the portion corresponding to the first pixel circuit and the source of the transistor T1b included in the portion corresponding to the second pixel circuit.

According to the pixel circuit 30, it is possible to detect the amount of light when the backlight is lit and the amount of light when the backlight is extinguished, similarly to the first and second pixel circuits 10a and 10b of the first embodiment. Accordingly, effects similar to those of the first embodiment are obtained. Also, since one photodiode D1 is shared between the two types of pixel circuits, there is no difference in photodiode characteristics between the two types of pixel circuits. This enables accurately obtaining the difference between the amount of light when the backlight is lit and the amount of light when the backlight is extinguished. Also, the number of photodiodes is reduced, thus enabling raising the aperture ratio and raising the sensitivity of the sensor pixel circuit.

Also, with the pixel circuit 30 as well, as described in the first embodiment, it is possible to appropriately insert frames for the first correction data acquisition mode and the second correction data acquisition mode among the frames for the sensor drive mode and correct at least either of offset and the gain of sensor output obtained in the sensor drive mode, using the first correction data $B_{1st}$ and the second correction data $B_{2nd}$ that were obtained in the respect modes. Similarly to the first embodiment, this enables obtaining sensor output that is highly precise and has a wide dynamic range.

Circuit Configuration Variations

The following changes can be made to the circuit configuration of the first embodiment that was described with reference to FIG. 6. FIGS. 19A to 19E are circuit diagrams showing pixel circuits according to first to fifth variations of the first embodiment. First pixel circuits 11a to 17a shown in FIGS. 19A to 19E are obtained by making the following changes to the first pixel circuit 10a of the first embodiment. Second pixel circuits 11b to 17b are obtained by making the same changes to the second pixel circuit 10b of the first embodiment.

Figure 19A:
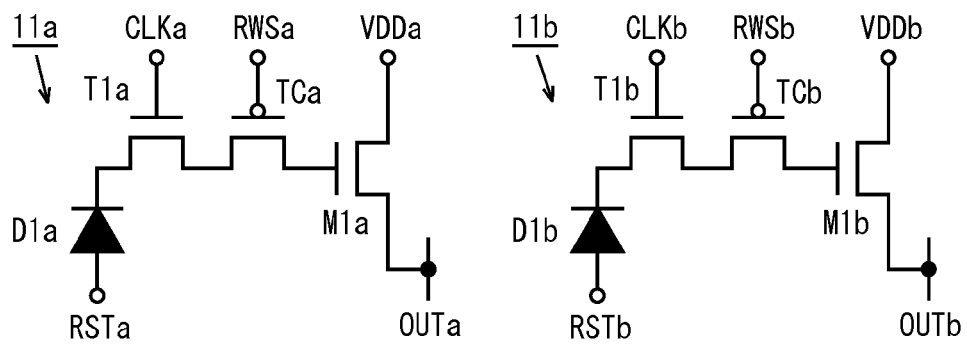
FIG. 19A is a circuit diagram of a sensor pixel circuit according to a first variation of the first embodiment.
Figure 24A:
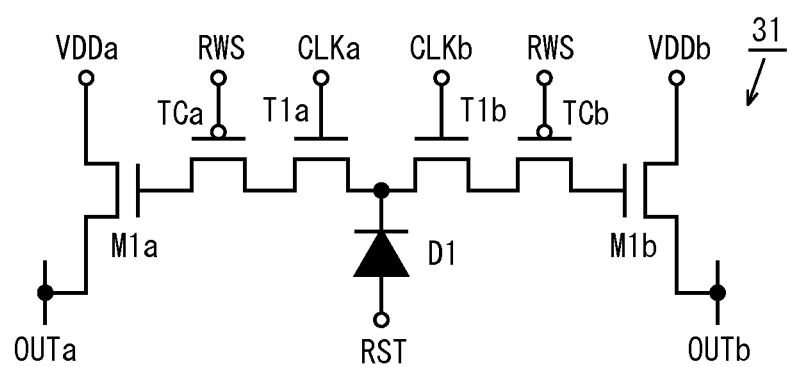
FIG. 24A is a circuit diagram of a sensor pixel circuit according to a first variation of the second embodiment.

The first pixel circuit 11a shown in FIG. 19A is obtained by replacing the capacitor C1 included in the first pixel circuit 10a with a transistor TCa, which is a P-type TFT. In the first pixel circuit 11a, the drain of the transistor TCa is connected to the drain of the transistor T1a, the source is connected to the gate of the transistor M1a, and the gate is connected to the readout line RWSa. When the readout high level is applied to the readout line RWSa, the transistor TCa connected in this way changes the potential of the accumulation node to a greater extent than the original pixel circuit. Accordingly, the difference between the potential of the accumulation node when intense light entered and the potential of the accumulation node when weak light entered is amplified, thus enabling an improvement in the sensitivity of the pixel circuit 11a. Making similar changes to the second embodiment obtains a pixel circuit 31 shown in FIG. 24A.

Figure 19B:
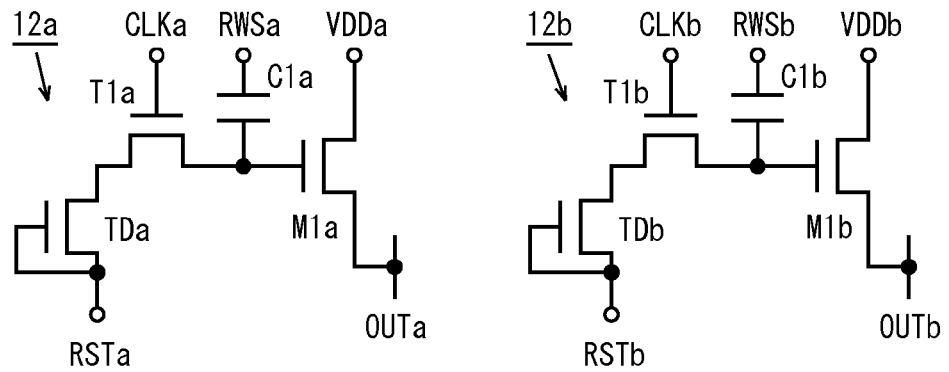
FIG. 19B is a circuit diagram of a sensor pixel circuit according to a second variation of the first embodiment.
Figure 24B:
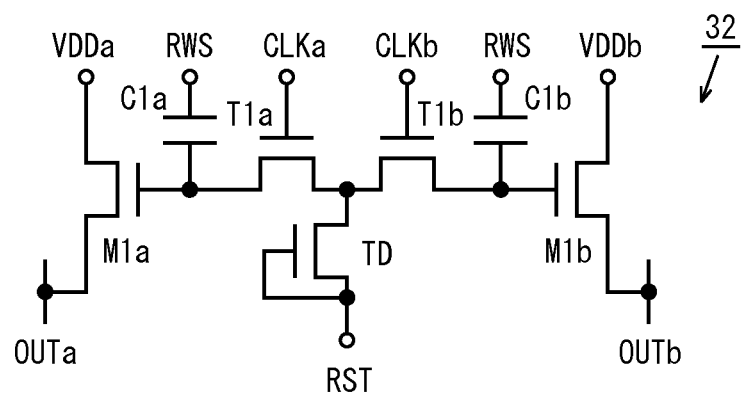
FIG. 24B is a circuit diagram of a sensor pixel circuit according to a second variation of the second embodiment.

A first pixel circuit 12a shown in FIG. 19B is obtained by replacing the photodiode D1 included in the first pixel circuit 10a with a phototransistor TDa. As a result, all of the transistors included in the first pixel circuit 12a are N-type transistors. Accordingly, the first pixel circuit 12a can be manufactured using a single-channel processing for forming only N-type transistors. Making similar changes to the second embodiment obtains a pixel circuit 32 shown in FIG. 24B.

Figure 19C:
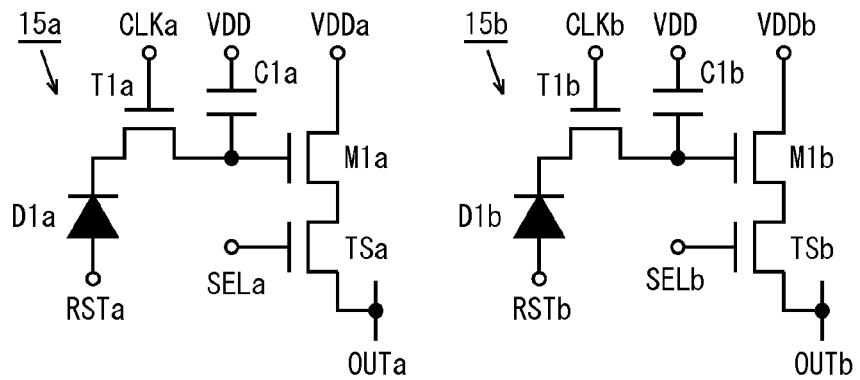
FIG. 19C is a circuit diagram of a sensor pixel circuit according to a third variation of the first embodiment.
Figure 24C:
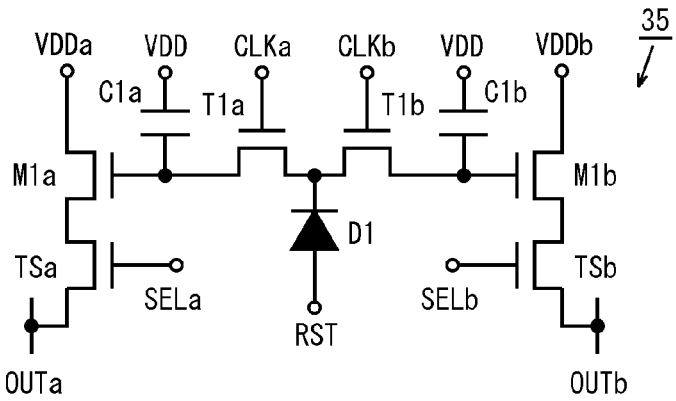
FIG. 24C is a circuit diagram of a sensor pixel circuit according to a third variation of the second embodiment.

A first pixel circuit 15a shown in FIG. 19C is obtained by adding a transistor TSa to the first pixel circuit 10a. The transistor TSa is an N-type TFT and functions as a switching element for selection. In the first pixel circuit 15a, the source of the transistor M1a is connected to the drain of the transistor TSa. The source of the transistor TSa is connected to the output line OUTa, and the gate is connected to a selection line SELa. A selection signal SELa rises to the high level when readout from the first pixel circuit 15a is to be performed. Also, whereas the capacitor C1a is connected to the readout line RSWa in the first pixel circuit 10a, it is connected to the power supply line VDD in the first pixel circuit 15a. This obtains a variation of the pixel circuit. Making similar changes to the second embodiment obtains a pixel circuit 35 shown in FIG. 24C.

Figure 20:
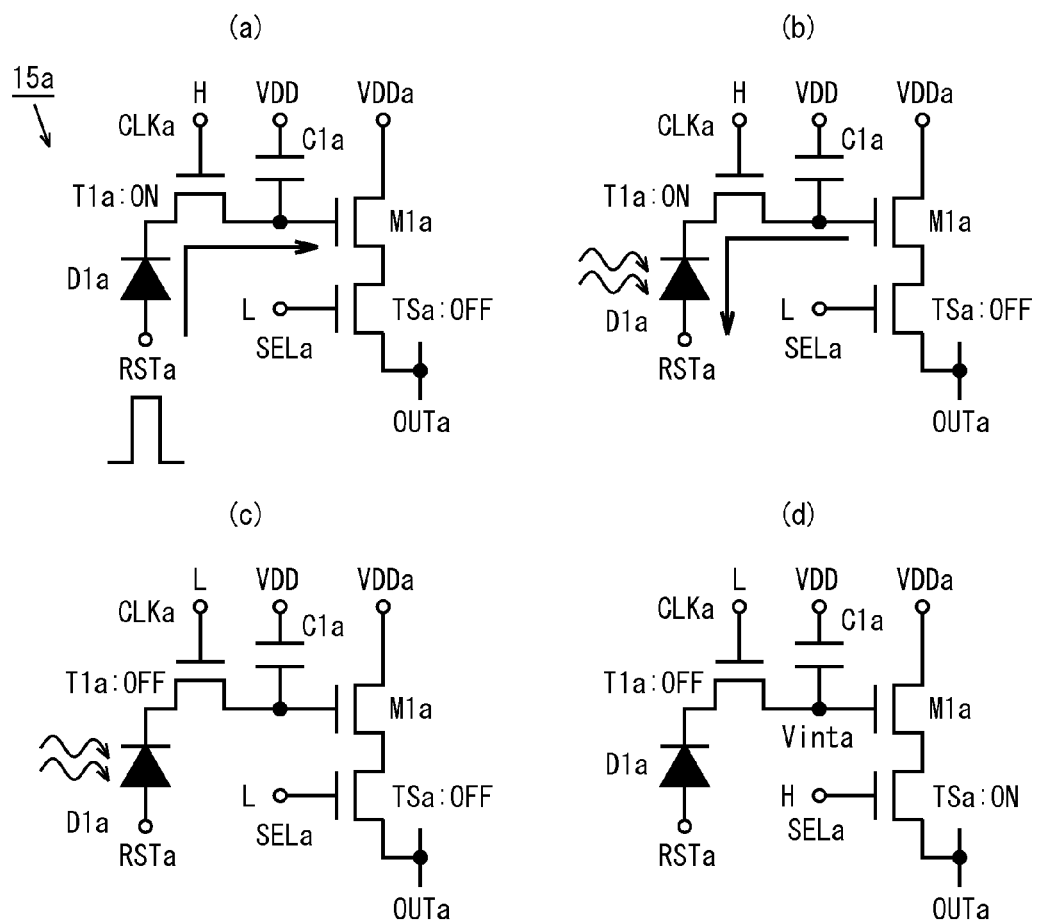
FIG. 20 is a diagram showing operations of the sensor pixel circuit shown in FIG. 19C.
Figure 21:
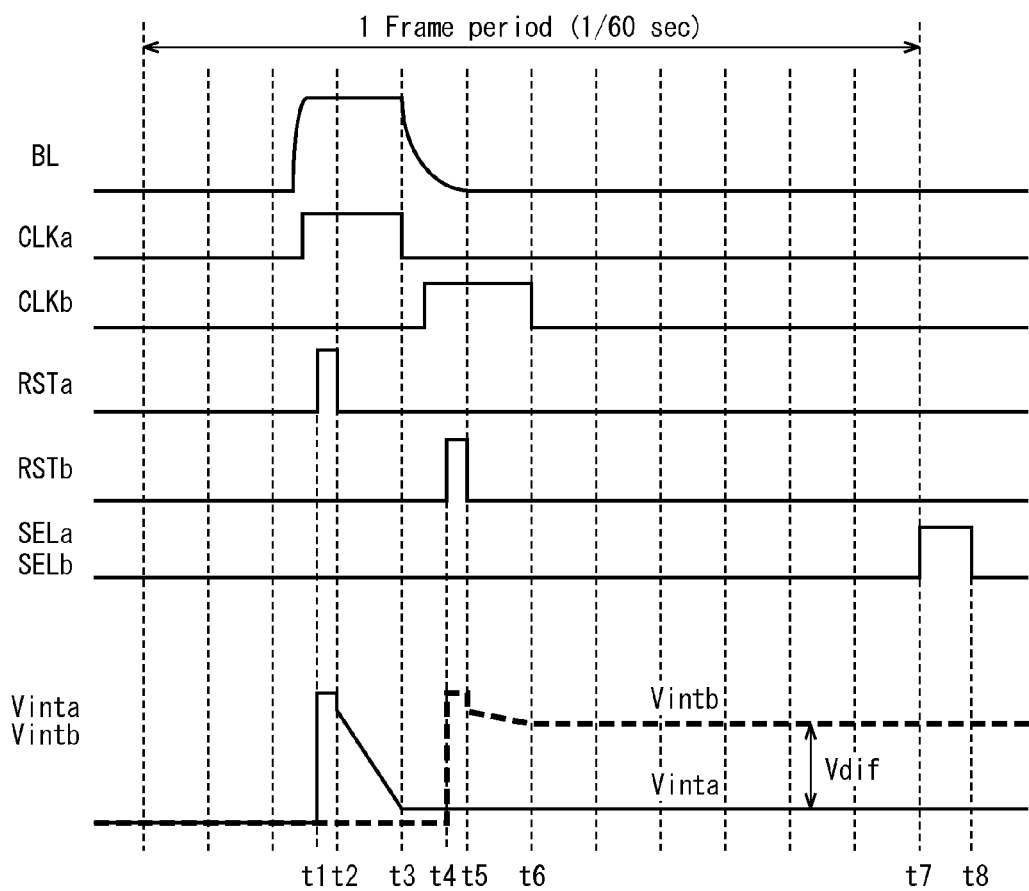
FIG. 21 is a waveform diagram showing signals of the sensor pixel circuit shown in FIG. 19C.

FIG. 20 is a diagram showing operations of the first pixel circuit 15a in the sensor drive mode. FIG. 21 is a waveform diagram showing signals of the first pixel circuit 15a. When readout is not to be performed, the selection signal SELa is at the low level, the transistor TSa is switched off, and the first pixel circuit 15a operates similarly to the first pixel circuit 10a ((a) to (c) in FIG. 20). When readout is to be performed, the selection signal SELa rises to the high level, and the transistor TSa switches on. At this time, a current Ia that corresponds to the potential Vinta flows between the drain and the source of the transistor M1a ((d) in FIG. 20).

Figure 19D:
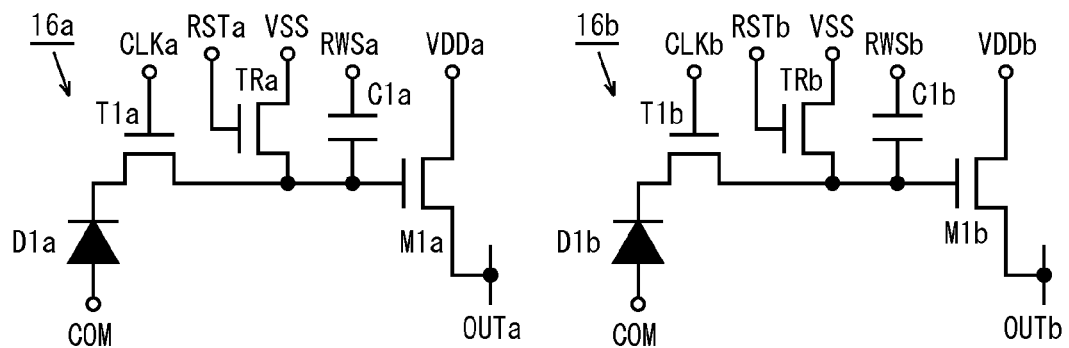
FIG. 19D is a circuit diagram of a sensor pixel circuit according to a fourth variation of the first embodiment.
Figure 24D:
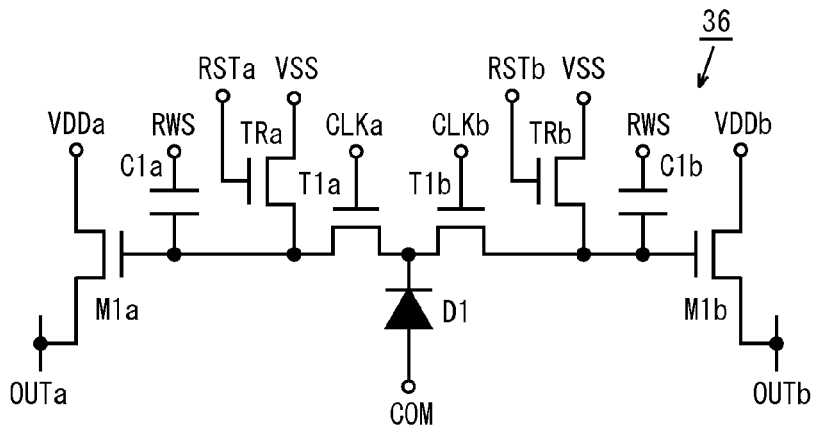
FIG. 24D is a circuit diagram of a sensor pixel circuit according to a fourth variation of the second embodiment.

A first pixel circuit 16a shown in FIG. 19D is obtained by adding a transistor TRa to the first pixel circuit 10a. The transistor TRa is an N-type TFT and functions as a switching element for resetting. In the first pixel circuit 16a, the source of the transistor TRa receives an application of a low level potential VSS, the drain is connected to the gate of the transistor M1a, and the gate is connected to the reset line RSTa. Also, the anode of the photodiode D1a receives an application of a low level potential COM. This obtains a variation of the pixel circuit. Making similar changes to the second embodiment obtains a pixel circuit 36 shown in FIG. 24D.

Figure 22:
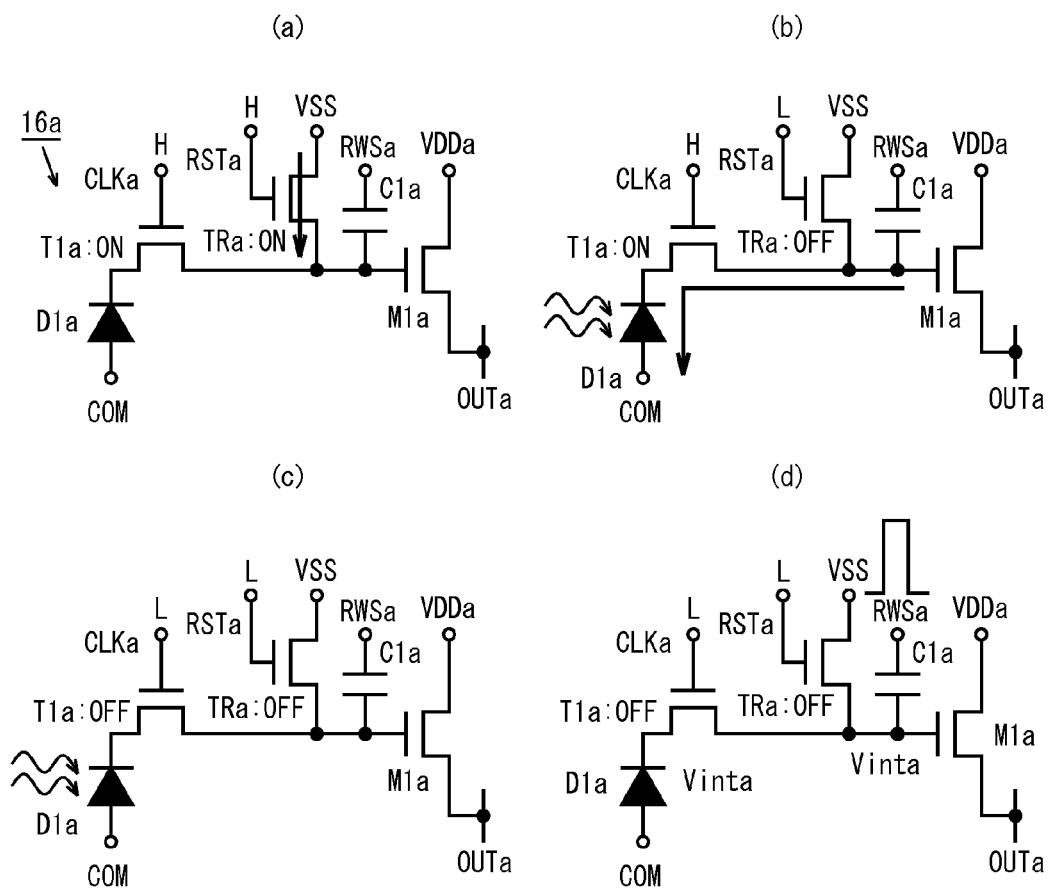
FIG. 22 is a diagram showing operations of the sensor pixel circuit shown in FIG. 19D.

FIG. 22 is a diagram showing operations of the first pixel circuit 16a in the sensor drive mode. When resetting is to be performed, the reset signal RSTa rises to the high level, the transistor TRa switches on, and the potential of the accumulation node (gate potential of the transistor M1a) is reset to the low level potential VSS ((a) in FIG. 22). When resetting is not to be performed, the reset signal RSTa is at the low level, and the transistor TRb is switched off ((b) to (d) in FIG. 22).

Figure 19E:
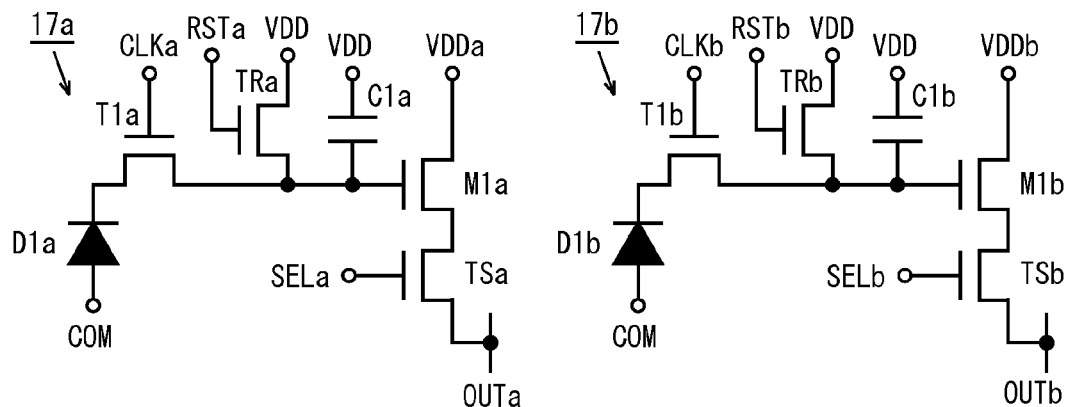
FIG. 19E is a circuit diagram of a sensor pixel circuit according to a fifth variation of the first embodiment.
Figure 24E:
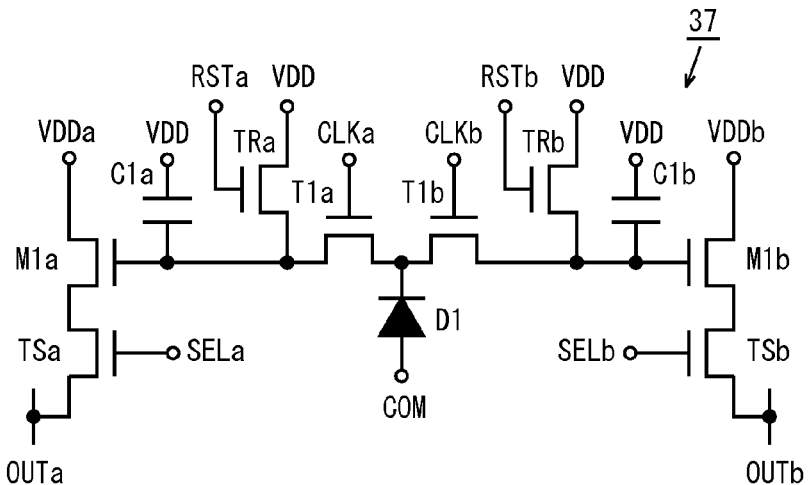
FIG. 24E is a circuit diagram of a sensor pixel circuit according to a fifth variation of the second embodiment.
Figure 25:
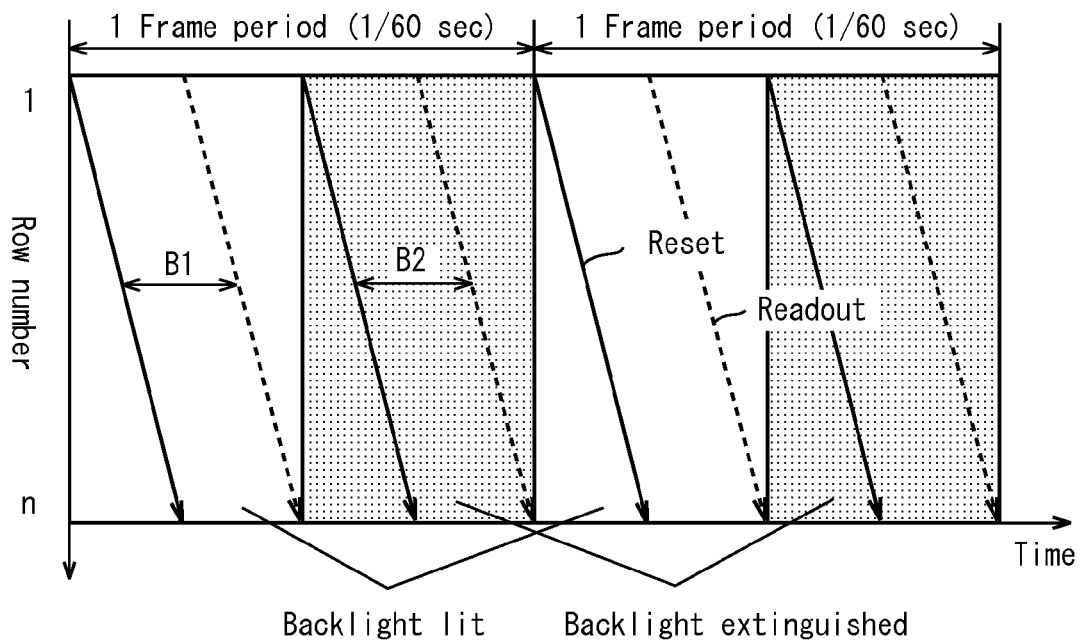
FIG. 25 is a diagram showing backlight lighting and extinguishing timings and photoreception element resetting and readout timings in a conventional input/output device.
Figure 26:
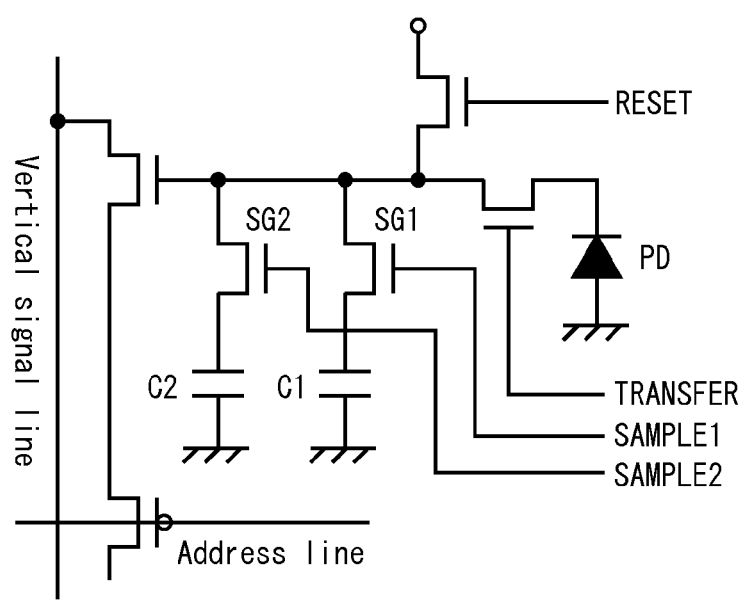
FIG. 26 is a circuit diagram showing a unit photoreception portion included in a conventional solid-state imaging device.

A first pixel circuit 17a shown in FIG. 19E is obtained by adding the transistors TSa and TRa to the first pixel circuit 10a. The connection configurations of the transistors TSa and TRa are the same as those in the first pixel circuits 15a and 16a. This obtains a variation of the pixel circuit. Making similar changes to the second embodiment obtains a pixel circuit 37 shown in FIG. 24E.

Figure 23:
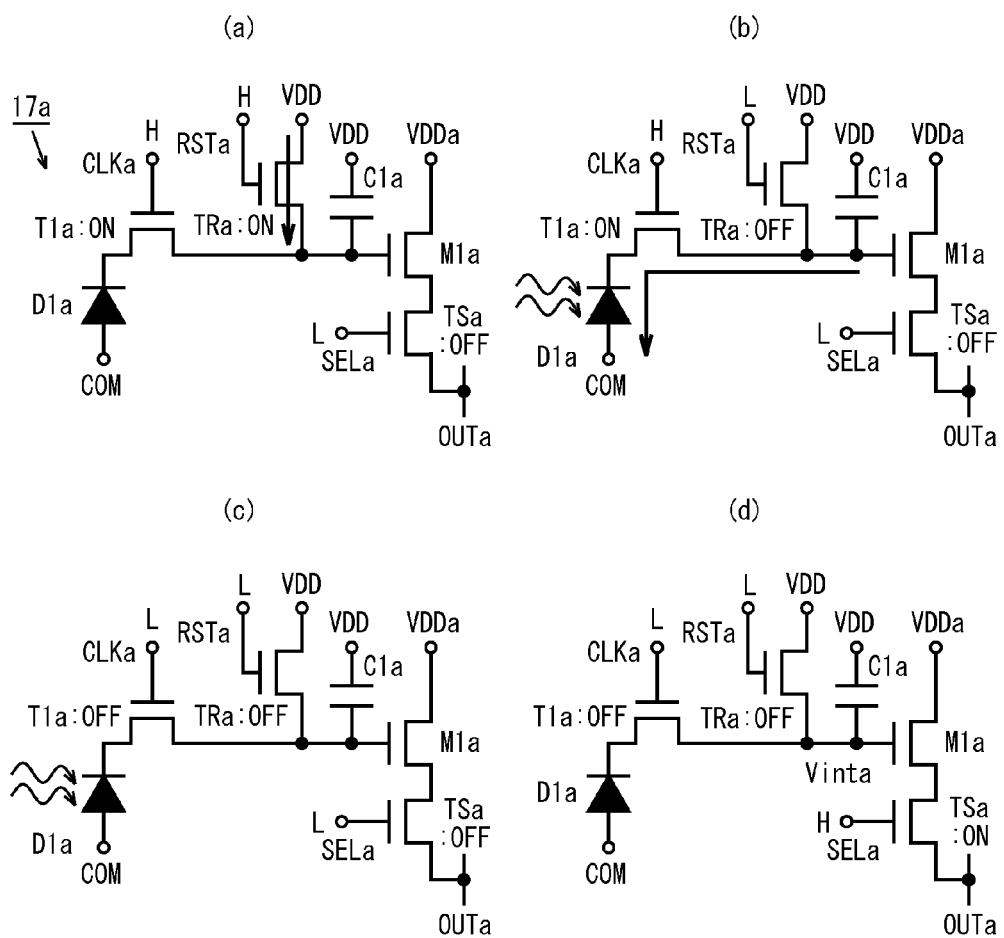
FIG. 23 is a diagram showing operations of the sensor pixel circuit shown in FIG. 19E.

FIG. 23 is a diagram showing operations of the first pixel circuit 17a in the sensor drive mode. When resetting is to be performed, the reset signal RSTa rises to the high level, the transistor TRa switches on, and the potential of the accumulation node (gate potential of the transistor M1a) is reset to the high level potential VDD ((a) in FIG. 23). When readout is to be performed, the selection signal SELa rises to the high level, and the transistor TSa switches on. At this time, a current Ia that corresponds to the potential Vinta flows between the drain and the source of the transistor M1a ((d) in FIG. 23). When resetting and readout are not to be performed, the reset signal RSTa and the selection signal SELa are at the low level ((b) and (c) in FIG. 23).

As described above, the display devices of the above-described embodiments and their variations individually include a first sensor pixel circuit that detects light in a detection period when the backlight is lit and holds the detected amount of light when not in that period, and a second sensor pixel circuit that detects light in a detection period when the backlight is extinguished and holds the detected amount of light when not in that period. Accordingly, the display devices of the above-described embodiments and their variations can obtain the difference between the two types of amounts of light outside the sensor pixel circuits and detect the difference between the amount of light when the backlight is lit and the amount of light when the backlight is extinguished, thus enabling providing an input function that resolves the conventional problems and is not dependent on the light environment.

Also, if sensor output is corrected using correction data that was acquired in the first and second correction data acquisition modes, it is possible to obtain sensor output that is highly precise and has a wide dynamic range.

Note that there is no particular limitation on the type of light source provided in the display device of the present invention. Accordingly, it is possible to light and extinguish a visible light backlight that is provided for display, for example. Alternatively, the display device may be provided with an infrared light backlight for light detection separately from the visible light backlight for display. This display device may be configured such that the visible light backlight is always lit, and only the infrared light backlight is lit and extinguished one time in one frame period.

The invention claimed is:

1. A display device provided with an active matrix substrate, the display device comprising:
   a photosensor provided in a pixel region of the active matrix substrate;
   sensor drive wiring connected to the photosensor;
   a sensor driver circuit that supplies a sensor drive signal to the photosensor via the sensor drive wiring;
   an amplifier circuit that amplifies a signal that was read out from the photosensor in accordance with the sensor drive signal, and outputs the signal as a photosensor signal;
   a signal processing circuit that processes the photosensor signal that was output from the amplifier circuit; and
   a light source for the photosensor,
   wherein the photosensor includes
   a first sensor pixel circuit that, in accordance with the sensor drive signal, accumulates a charge that corresponds to an amount of light received in an accumulation period when the light source is lit, and outputs, when a readout period arrives, a sensor signal that corresponds to the charge that corresponds to the amount of light received in the accumulation period when the light source is lit, and
   a second sensor pixel circuit that, in accordance with the sensor drive signal, accumulates a charge that corresponds to an amount of light received in an accumulation period when the light source is extinguished, and outputs, when a readout period arrives, a sensor signal that corresponds to the charge that corresponds to the amount of light received in the accumulation period when the light source is extinguished,
   in one frame period, the sensor driver circuit includes each of:
   a sensor drive mode for obtaining the sensor signals from the first sensor pixel circuit and the second sensor pixel circuit of the photosensor,
   a first correction data acquisition mode in which first correction data for correcting the sensor signal obtained from the first sensor pixel circuit is acquired using a sensor drive signal that is different from that in the sensor drive mode, and a second correction data acquisition mode in which second correction data for correcting the sensor signal obtained from the second sensor pixel circuit is acquired using a sensor drive signal that is different from that in the sensor drive mode, the accumulation period when the light source is lit in the first correction data acquisition mode is shorter than the accumulation period when the light source is lit in the sensor drive mode, and the accumulation period when the light source is extinguished in the second correction data acquisition mode is shorter than the accumulation period when the light source is extinguished in the sensor drive mode.

2. The display device according to claim 1, wherein a lit period of the light source in the first correction data acquisition mode is shorter than a lit period of the light source in the sensor drive mode.

3. The display device according to claim 2, wherein a timing at which lighting of the light source starts in one frame period in the first correction data acquisition mode is the same as that in the sensor drive mode.

4. The display device according to claim 3, wherein a period from a time at which the accumulation period starts until a time at which the light source lit period ends in the first correction data acquisition mode is shorter than a period from a time at which the accumulation period starts until a time at which the light source lit period ends in the sensor drive mode.

5. The display device according to claim 4, wherein the duration of a period from a time at which the accumulation period ends until a time at which the light source lit period ends in the first correction data acquisition mode is the same as the duration of a period from a time at which the accumulation period ends until a time at which the light source lit period ends in the sensor drive mode.

6. The display device according to claim 1, wherein the light source lit period in the second correction data acquisition mode is longer than the light source lit period in the first correction data acquisition mode.

7. The display device according to claim 6, wherein timings at which the light source lit period starts and ends in one frame period in the second correction data acquisition mode are the same as timings at which the light source lit period starts and ends in one frame period in the sensor drive mode.

8. The display device according to claim 1,
wherein letting B be a photosensor signal level obtained from the second sensor pixel circuit in the sensor drive mode, $B_{1st}$ be a photosensor signal level obtained from the first sensor pixel circuit in the first correction data acquisition mode, and $B_{2nd}$ be a photosensor signal level obtained from the first sensor pixel circuit in the second correction data acquisition mode, the signal processing circuit obtains a corrected photosensor signal level R' from a photosensor signal level R obtained from the first sensor pixel circuit in the sensor drive mode as follows:

$$R'=(R-B_{1st})-(B-B_{2nd}).$$

9. The display device according to claim 1,
wherein letting B be a photosensor signal level obtained from the second sensor pixel circuit in the sensor drive mode, $B_{1st}$ be a photosensor signal level obtained from the first sensor pixel circuit in the first correction data acquisition mode, and $B_{2nd}$ be a photosensor signal level obtained from the first sensor pixel circuit in the second correction data acquisition mode, in the first correction data acquisition mode, a gain correction photosensor signal level $W_{1st}$ is acquired due to the sensor driver circuit supplying a readout signal whose amplitude is smaller than the amplitude of a readout signal in the sensor drive mode, in the second correction data acquisition mode, a gain correction photosensor signal level $W_{2nd}$ is acquired due to the sensor driver circuit supplying a readout signal whose amplitude is smaller than the amplitude of the readout signal in the sensor drive mode, and letting L be the number of photosensor signal levels,
the signal processing circuit obtains a corrected photosensor signal level R' from a photosensor signal level R obtained from the first sensor pixel circuit in the sensor drive mode as follows:

$$R'=L\times\{R/(W_{1st}-B_{1st})-B/(W_{2nd}-B_{2nd})\}.$$

10. The display device according to claim 1,
wherein letting B be a photosensor signal level obtained from the second sensor pixel circuit in the sensor drive mode, $B_{1st}$ be a photosensor signal level obtained from the first sensor pixel circuit in the first correction data acquisition mode, and $B_{2nd}$ be a photosensor signal level obtained from the first sensor pixel circuit in the second correction data acquisition mode, in the first correction data acquisition mode, a gain correction photosensor signal level $W_{1st}$ is acquired due to the sensor driver circuit supplying a readout signal whose amplitude is smaller than the amplitude of a readout signal in the sensor drive mode, in the second correction data acquisition mode, a gain correction photosensor signal level $W_{2nd}$ is acquired due to the sensor driver circuit supplying a readout signal whose amplitude is smaller than the amplitude of the readout signal in the sensor drive mode, and letting L be the number of photosensor signal levels,
the signal processing circuit obtains a corrected photosensor signal level R' from a photosensor signal level R obtained from the first sensor pixel circuit in the sensor drive mode as follows:

$$R'=L\times\{(R-B_{1st})/(W_{1st}-B_{1st})-(B-B_{2nd})/(W_{2nd}-B_{2nd})\}.$$

11. The display device according to claim 1,
wherein the first and second sensor pixel circuits include one photoreception element, one accumulation node that accumulates a charge that corresponds to the detected amount of light, a readout transistor that has a control terminal capable of electrical connection to the accumulation node, and a switching element for holding that is provided on a path of current that flows in the photoreception element, and switches on/off in accordance with the control signal.

12. The display device according to claim 11,
wherein in the first and second sensor pixel circuits,
the switching element for holding is provided between the accumulation node and one end of the photoreception element, and the other end of the photoreception element is connected to a reset line.

13. The display device according to claim 1,
wherein the first and second sensor pixel circuits share one photoreception element, and one end of the photoreception element is connected to one end of the switching element for holding included in each of the first and second sensor pixel circuits, and the other end of the photoreception element is connected to the reset line.

14. The display device according to claim 1, further comprising:
   a common substrate opposing the active matrix substrate; and
   liquid crystal sandwiched between the active matrix substrate and the common substrate.

* * * * *